(12) United States Patent
Taylor et al.

(10) Patent No.: US 11,308,401 B2
(45) Date of Patent: Apr. 19, 2022

(54) INTERACTIVE REINFORCEMENT LEARNING WITH DYNAMIC REUSE OF PRIOR KNOWLEDGE

(71) Applicant: ROYAL BANK OF CANADA, Montreal (CA)

(72) Inventors: Matthew Edmund Taylor, Edmonton (CA); Zhaodong Wang, Pullman, WA (US)

(73) Assignee: ROYAL BANK OF CANADA, Toronto (CA)

( * ) Notice: Subject to any disclaimer, the term of this patent is extended or adjusted under 35 U.S.C. 154(b) by 421 days.

(21) Appl. No.: 16/263,930

(22) Filed: Jan. 31, 2019

(65) Prior Publication Data

US 2019/0236458 A1    Aug. 1, 2019

Related U.S. Application Data

(60) Provisional application No. 62/624,543, filed on Jan. 31, 2018.

(51) Int. Cl.
| | | |
|---|---|---|
| *G06N 5/02* | (2006.01) | |
| *G06N 20/00* | (2019.01) | |
| *G06F 17/17* | (2006.01) | |
| *G06N 3/04* | (2006.01) | |

(52) U.S. Cl.
CPC ............. *G06N 5/022* (2013.01); *G06F 17/17* (2013.01); *G06N 3/04* (2013.01); *G06N 20/00* (2019.01)

(58) Field of Classification Search
CPC .......... G06N 5/022; G06N 20/00; G06N 3/04; G06N 3/0454; G06N 3/08; G06N 7/005; G06N 3/006; G06F 17/17
See application file for complete search history.

(56) References Cited

U.S. PATENT DOCUMENTS 9,536,191 B1 *   1/2017   Arel .................... G06N 3/0454

OTHER PUBLICATIONS

Hester, Todd, et al. "Deep Q-learning from Demonstrations" (2017). https://arxiv.org/abs/1704.03732 (Year: 2017).*
Wang, Zhaodong, and Matthew E. Taylor. "Effective Transfer via Demonstrations in Reinforcement Learning: A Preliminary Study." AAAI Spring Symposia. 2016. https://www.aaai.org/ocs/index.php/SSS/SSS16/paper/view/12739/11925 (Year: 2016).*
Brys, Tim, et al. "Combining multiple correlated reward and shaping signals by measuring confidence." Proceedings of the AAAI Conference on Artificial Intelligence. vol. 28. No. 1. 2014. https://www.aaai.org/ocs/index.php/AAAI/AAAI14/paper/viewFile/8390/8795 (Year: 2014).*

(Continued)

*Primary Examiner* — Kakali Chaki
*Assistant Examiner* — Michael H Hoang
(74) *Attorney, Agent, or Firm* — Norton Rose Fulbright Canada LLP

(57) ABSTRACT

Systems, methods, and computer readable media directed to interactive reinforcement learning with dynamic reuse of prior knowledge are described in various embodiments. The interactive reinforcement learning is adapted for providing computer implemented systems for dynamic action selection based on confidence levels associated with demonstrator data or portions thereof.

18 Claims, 12 Drawing Sheets

(56) References Cited

OTHER PUBLICATIONS

Suay, Halit Bener, et al. "Learning from demonstration for shaping through inverse reinforcement learning." Proceedings of the 2016 International Conference on Autonomous Agents & Multiagent Systems. 2016. http://www.ifaamas.org/Proceedings/aamas2016/pdfs/p429.pdf (Year: 2016).*
JS Albus. 1981. Brains, Behavior. & Robotics. Peterboro, NH: Byte Books (1981).
Brenna D Argall, Sonia Chernova, Manuela Veloso, and Brett Browning. 2009. A survey of robot learning from demonstration. Robotics and autonomous systems 57, 5 (2009), 469-483.
R Bellman. 1957. Dynamic Programming Princeton University Press Princeton. New Jersey Google Scholar (1957).
Christopher M Bishop. 2006. Pattern recognition. Machine Learning 128 (2006), 1-58.
Greg Brockman, Vicki Cheung, Ludwig Pettersson, Jonas Schneider, John Schulman, Jie Tang, and Wojciech Zaremba. 2016. OpenAI gym. arXiv preprint arXiv:1606.01540 (2016).
Tim Brys, Anna Harutyunyan, Matthew E Taylor, and Ann Nowé. 2015. Policy transfer using reward shaping. In Proceedings of the 2015 International Conference on Autonomous Agents and Multiagent Systems. International Foundation for Autonomous Agents and Multiagent Systems, 181-188.
Sonia Chernova and Manuela Veloso. 2007. Confidence-based policy learning from demonstration using gaussian mixture models. In Proceedings of the 6th international joint conference on Autonomous agents and multiagent systems. ACM, 233.
Fernando Fernández and Manuela Veloso. 2006. Probabilistic policy reuse in a reinforcement learning agent. In Proceedings of the fifth international joint conference on Autonomous agents and multiagent systems. ACM, 720-727.
Sergey Karakovskiy and Julian Togelius. 2012. The mario ai benchmark and competitions. IEEE Transactions on Computational Intelligence and AI in Games 4, 1 (2012), 55-67.
Volodymyr Mnih, Koray Kavukcuoglu, David Silver, Andrei A Rusu, Joel Veness, Marc G Bellemare, Alex Graves, Martin Riedmiller, Andreas K Fidjeland, Georg Ostrovski, et al. 2015. Human-level control through deep reinforcement learning. Nature 518, 7540 (2015), 529-533.
Ross Quinlan. 1993. C4.5: Programs for Machine Learning. Morgan Kaufmann Publishers, San Mateo, CA.
Gavin A Rummery and Mahesan Niranjan. 1994. On-line Q-learning using connectionist systems. (1994).
Stefan Schaal. 1997. Learning from demonstration. In Advances in neural information processing systems. 1040-1046.
Satinder P Singh and Richard S Sutton. 1996. Reinforcement learning with replacing eligibility traces. Machine learning 22, 1-3 (1996), 123-158.
Halit Bener Suay, Tim Brys, Matthew E Taylor, and Sonia Chernova. 2016. Learning from demonstration for shaping through inverse reinforcement learning. In Proceedings of the 2016 International Conference on Autonomous Agents & Multiagent Systems. International Foundation for Autonomous Agents and Multiagent Systems, 429-437.
Richard S Sutton and Andrew G Barto. 1998. Reinforcement learning: An introduction. vol. 1. MIT press Cambridge.
Matthew E Taylor and Peter Stone. 2007. Cross-domain transfer for reinforcement learning. In Proceedings of the 24th international conference on Machine learning. ACM, 879-886.
Matthew E. Taylor and Peter Stone. 2009. Transfer Learning for Reinforcement Learning Domains: A Survey. Journal of Machine Learning Research 10, 1 (2009), 1633-1685.
Matthew E. Taylor, Halit Bener Suay, and Sonia Chernova. 2011. Integrating Reinforcement Learning with Human Demonstrations of Varying Ability. In Proceedings of the International Conference on Autonomous Agents and Multiagent Systems (AAMAS).
Zhaodong Wang and Matthew E. Taylor. 2017. Improving Reinforcement Learning with Confidence-Based Demonstrations. In Proceedings of the 26th International Conference on Artificial Intelligence (IJCAI).
Christopher JCH Watkins and Peter Dayan. 1992. Q-learning. Machine learning 8, 3-4 (1992), 279-292.
Ian H. Witten and Eibe Frank. 2005. Data Mining: Practical Machine Learning Tools and Techniques (2nd ed.). Morgan Kaufmann, San Francisco.

* cited by examiner

INTERACTIVE REINFORCEMENT LEARNING WITH DYNAMIC REUSE OF PRIOR KNOWLEDGE

CROSS-REFERENCE TO RELATED APPLICATIONS

This application is a non-provisional of, and claims all benefit, including priority to, U.S. Application No. 62/624,543, filed 31 Jan. 2018, entitled "INTERACTIVE REINFORCEMENT LEARNING WITH DYNAMIC REUSE OF PRIOR KNOWLEDGE", incorporated herein by reference in its entirety.

FIELD

The present disclosure generally relates to the field of machine learning, and more specifically, to interactive reinforcement learning with dynamic reuse of prior knowledge (DRoP).

INTRODUCTION

There have been increasingly successful applications of reinforcement learning methods in both virtual agents and physical robots.

However, in complex domains, reinforcement learning (RL) often suffers from slow learning speeds, which is particularly detrimental when initial performance is critical. In particular, convergence can be slow, and a large number of epochs could be required. This challenge is exacerbated in relation to reinforcement learning, where the agents may be actors that perform actions in real-world settings or real-world environments that are difficult to simulate (e.g., automated stock trading where every misstep is costly).

External knowledge could be leveraged by RL agents to boost learning speeds—demonstrations have been shown to be a good type of knowledge for many types of agents' learning. To leverage demonstrations, one method is transfer learning, where one (source) agent is used to speed up learning in a second (target) agent.

However, many existing transfer learning methods could provide limited help for complex tasks, since there are assumptions about the source and/or target agent's internal representation, demonstration type, learning method, etc.

One approach is the Human Agent Transfer (HAT) process, which provided a framework where a source agent could demonstrate policy and a target agent could improve its performance over that policy. As refinement, a Confidence Human Agent Transfer process was proposed by leveraging the confidence measurement on the policy. Notice that these methods are different from demonstration learning work, as the target agent is learning to outperform demonstrators rather than reproducing the same policies.

There are other knowledge transfer approaches like Probabilistic Policy Reuse. However, they came with assumptions on specific types of tasks: both the source and the target agents shall share same internal representations and optimal demonstrations are required. In this disclosure, Applicant is focusing on improving learning performance without such assumptions.

The target agent must handle multiple potential problems. First, the source agent may be suboptimal. Second, prior knowledge from different sources may be inconsistent and therefore the target agent can be confused about which one to follow. Third, the source agent typically can never exhaustively demonstrate all possible actions over the entire enormous state space; models (e.g., a decision tree) used to summarize the prior knowledge must generalize to unseen states, which may be incorrect. Fourth, the target agent may have a hard time balancing the usage of the prior knowledge and the self-learned policy.

SUMMARY

Systems, methods, and computer readable media directed to interactive reinforcement learning with dynamic reuse of prior knowledge are described in various embodiments. In particular, computer implemented systems and methods configured for receiving third party actor demonstrator data sets (e.g., data sets representing states and/or actions of human actions or computer-based actors) and utilizing the third party actor data sets for conducting pre-training of an underlying machine learning mechanism (e.g., a neural network).

In particular, the pre-training mechanism improves the functioning of the machine learning systems through reducing a level of required computational resources for training a neural network, by including mechanisms that attempt to adapt to differences in demonstrator data sets. Not all demonstrators (human or machine) are equally adept, and similarly, there may be inconsistencies across a single demonstrator for different tasks/actions.

In the context of a reinforcement learning system, where actors (human or machine) interact with an environment through a set of actions that potentially modify a state or other characteristics of the environment, the outcome may be require adeptness at multiple tasks. An example system may be required to control a mechanical process in a manufacturing line for grading, inspecting, and placing eggs into cartons.

The system may receive data sets representative of observations (e.g., action inputs/environmental states) of actors (e.g., workers or other trained robots) conducting these tasks. However, there may be varying levels of adeptness (e.g., ability to achieve a reward), and the levels may also vary as between tasks (e.g., an actor is good at grading, but not inspecting or placing eggs into cartons).

The system, of some embodiments, is adapted for comparisons with of the observations of the actors against the internal training of the machine learning mechanism of the system. Confidence data structures are tracked (e.g., maintained) for the actors, and their underlying demonstrator data sets, or portions thereof. A dynamic determination mechanism selects a source (e.g., actor-source determination) upon which an action should be selected. The choice of which actor-source was selected is utilized as a feedback to modify the confidence associated with their underlying demonstrator data sets, or portions thereof.

As described in various embodiments, an interactive reinforcement learning mechanism is adapted for providing computer implemented systems for (i) identifying demonstration data that is contradictory, and not using it as the basis for a decision; and/or (ii) determining that insufficient demonstration data has been provided, and prompting for more data to be submitted.

The systems are utilized to provide improved machine learning outcomes, in particular, by determining characteristics of demonstration data in relation to machine learning, whereby indications or features extracted from data sets representing prior knowledge are utilized in providing an effective transfer approach.

A combination of offline knowledge and online confidence-based performance analysis can be utilized to dynamically involve the demonstrator's knowledge, integrating the knowledge into a reinforcement learning agent's learning loop to provide improved machine learning. These concepts are also discussed in a non-limiting example context of training to play a videogame. There may be effectively an infinite number of game states, and other non-game applications are contemplated.

A machine learning architecture (referred to as machine learning model) trained with demonstration data will try to generalize that data to determine what to do in a particular game state. Where it is determined that there is insufficient demonstration data to determine what to do, the system may pause and prompt for a demonstrator to provide more demonstration data (e.g., play the game). In an embodiment, the system asks for a human to play for 10 seconds, and then tries to proceed again on its own.

The system of some embodiments is configured for performing a confidence analysis. If the system's confidence level in the demonstration data drops below a certain threshold, the system prompts for more data. The measure of confidence may be dynamic, such that the demonstrated data may provide a high enough confidence score when playing certain parts of the game, but in other parts, the confidence level drops.

In some embodiments, the system is configured to utilize the confidence values to productively request additional demonstrations from a human or an agent.

In accordance with some embodiments, there is provided a method of biasing (e.g., selectively/dynamically biasing for bootstrapping learning) a machine learning model using one or more demonstrator data sets, and configured to control one or more actions conducted by an agent in an environment which transitions between one or more states.

The method includes receiving the one or more demonstrator data sets, each demonstrator data set including a data structure representing one or more state-action pairs observed in one or more interactions with the environment. The demonstrator data sets can be obtained, for example, by human demonstrators, or machine-based demonstrators. The state-action pairs include actions (e.g., inputs, such as those to a Mario™ game), and states of the environment (e.g., for a Mario™ game, the output of a screen). The states can be associated with rewards (e.g., for a Marion™ game, the score).

For each demonstrator data set or sub-portions thereof, maintaining (e.g., periodically updating) one or more confidence data values is maintained. A trained classifier is trained using the one or more demonstrator data sets or sub-portions thereof, and an action is selected from an action-source selected from at least one of the one or more demonstrator data sets or an internal policy function maintained by the machine learning model, the selecting based at least upon the one or more confidence data values.

A system implementing the machine learning model executes the action, and observes (e.g., through sensors) a new state resulting from the executed action and an associated reward outcome. The internal policy function maintained by the machine learning model is updated based at least on the observed reward outcome.

In another aspect, the confidence data values of the one or more confidence data values based on the observed reward outcome is also updated.

In another aspect, the confidence data values are generated using a dynamic temporal difference confidence measurement based on the relation:

$$C(s) \leftarrow (1-F(\alpha))XC(s)+F(\alpha)X[F(r)+\gamma XC(s')]$$

where γ is a discount factor, r is a reward function, and α is an update parameter.

In another aspect, the temporal difference confidence measurement includes a dynamic rate update function based on the relation:

$$F(\alpha) = \alpha \times \max\left\{\frac{1}{\sum_i \exp(\theta_i^T \cdot x)}\begin{bmatrix}\exp(\theta_1^T \cdot x))\\ \exp(\theta_2^T \cdot x))\\ \ldots\\ \exp(\theta_i^T \cdot x))\end{bmatrix}\right\}.$$

In another aspect, the temporal difference confidence measurement includes a dynamic confidence update function based on the relation:

$$F(r) = \frac{r}{r\_max} \times \max\left\{\frac{1}{\sum_i \exp(\theta_i^T \cdot x)}\begin{bmatrix}\exp(\theta_1^T \cdot x))\\ \exp(\theta_2^T \cdot x))\\ \ldots\\ \exp(\theta_i^T \cdot x))\end{bmatrix}\right\}$$

wherein $$\frac{r}{r\_max}$$

is a normalized reward.

In another aspect, the selecting of the action-source is based upon an action selection mechanism including a hard decision model adapted for maximizing a current confidence expectation.

In another aspect, the selecting of the action-source is based upon an action selection mechanism including a soft decision model adapted for maximizing a current confidence expectation, the soft decision model normalizing a confidence in prior knowledge score (CP(s)) and a confidence in machine learning model policy function (CQ(s)) based on the relation:

$$\tanh(rCQ) = \frac{e^{rCQ} - e^{-rCQ}}{e^{rCQ} + e^{-rCQ}};$$

and the action-source is determined based the relation:

$$AS = \begin{cases} Q & P = \frac{\tanh(rCQ)+1}{\tanh(rCP)+\tanh(rCQ)+2} \\ \text{Prior} & P = \frac{\tanh(rCP)+1}{\tanh(rCP)+\tanh(rCQ)+2} \end{cases}. \quad (1)$$

In another aspect, the selecting of the action-source is based upon an action selection mechanism including a soft-hard-ε decision model including an ε-greedy switch for greedily exploiting a determined confidence value while performing probabilistic exploration.

In another aspect, the one or more demonstrator data sets are a plurality of demonstrator data sets, including at least a first demonstrator data set provided from a first demonstrator and a second demonstrator data set provided from a second demonstrator, and the selection of the action-source includes selecting at least from between the first demonstrator data set and the second demonstrator data set.

In another aspect, if the confidence data value associated with a specific demonstrator data set or a portion thereof is reduced beyond a threshold value, the method comprises generating a notification requesting improved demonstration data sets from an associated source of demonstration data sets. For example, the notification may indicate that the demonstrator is not useful anymore at the particular learning stage of the machine learning model (e.g., an average chess player is not good enough to provide useful demonstrations anymore), and accordingly, a request for improved demonstration data sets from an associated source of demonstration data sets is required.

In another aspect, if the machine learning model's policy function (e.g., Q-knowledge model) has not increased meaningfully within a number of epochs, the method further comprises requesting demonstrator data sets for re-training.

In accordance with another aspect, the neural network is configured to maintain an online confidence model and an agent Q-knowledge model, and a combination of a first proportion of the online confidence model and a second proportion of the agent Q-knowledge model are used for action selection, the first proportion and the second proportion varied to modify an overall proportion of contribution.

In accordance with another aspect, the neural network is configured to integrate the one or more weights and the one or more data sets in a reinforcement learning loop.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1A:
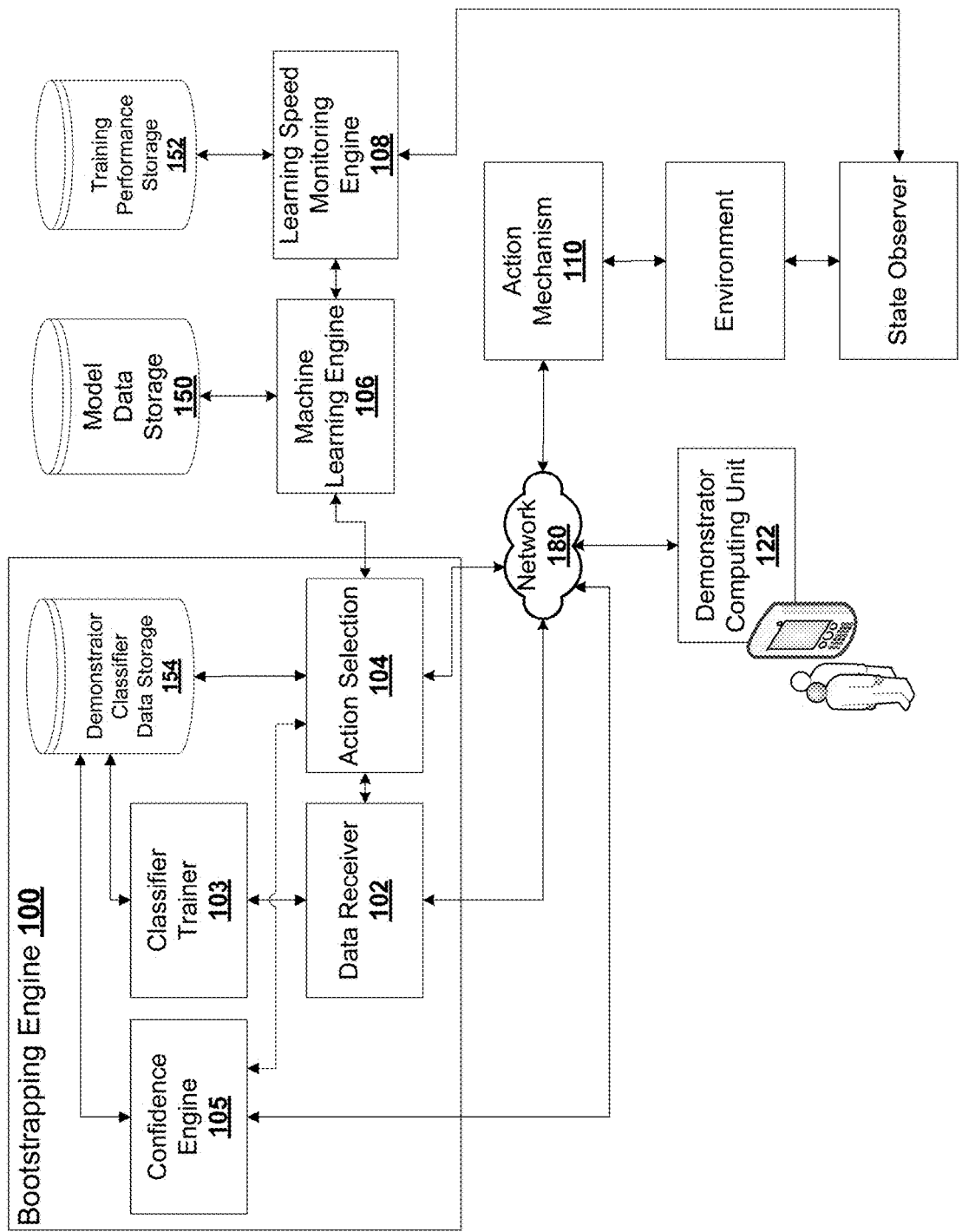
FIG. 1A is a block schematic of an example system for training machine learning models with demonstration data for deep reinforcement learning, according to some embodiments.

Reinforcement learning has enjoyed multiple successes in recent years. However, these successes typically require very large amounts of data before an agent achieves acceptable performance. Embodiments described herein introduce a novel approach of combating such requirements by leveraging existing (human or agent) knowledge. In particular, embodiments use demonstrations from agents and humans, allowing an untrained agent to quickly achieve high performance.

Applicants empirically compare with, and highlight the weakness of, HAT and CHAT, methods of transferring knowledge from a source agent/human to a target agent. A weakness of CHAT is highlighted: its confidence measurement on transferred knowledge is focused on the source demonstration dataset.

Some embodiments introduce an effective transfer approach, DRoP, combining the offline knowledge (demonstrations recorded before learning) with online confidence-based performance analysis. DRoP dynamically involves the demonstrator's knowledge, integrating it into the reinforcement learning agent's online learning loop to achieve efficient and robust learning.

DRoP (Dynamic Reuse of Prior) is an interactive method to boost Reinforcement Learning by addressing the above problems. DRoP uses temporal difference models to perform online confidence measurement on transferred knowledge.

In addition, Applicants have three action decision models to help the target agent balance between following the source advice and following its own learned knowledge. Applicants evaluate DRoP using the domains of Cartpole™ and Mario™, showing improvement over existing methods. Furthermore, through this online confidence measurement, DRoP is also capable of leveraging demonstrations from multiple sources.

Reinforcement Learning

By exploring and interacting with the environment, an RL agent can learn a policy based on environmental interactions. A Markov decision process (MDP) is common formulation of the RL problem. In an MDP, A is a set of actions an agent can take and S is a set of states. There are two (initially unknown) functions within this process: a transition function (T:S✕A|→S) and a reward function (R:S✕A|→R).

The goal of RL is to maximize the expected reward—different RL algorithms have different ways of approaching this goal. For example, two RL approaches are SARSA:

$$Q(s,a) \leftarrow Q(s,a)+\alpha[r+\gamma Q(s',a')-Q(s,a)]$$

and Q-learning:

$$Q(s,a) \leftarrow Q(s,a)+\alpha[r+\gamma \max Q(s',a')-Q(s,a)]$$

Probabilistic Policy Reuse (PPR)

Given a library $L=\{\Pi_1, \ldots, \Pi_n\}$ of n past optimal polices, Probabilistic Policy Reuse (PPR) will solve a task by exploiting the set of policies. Average rewards upon different polices are used to decide which policy to exploit.

This method improves reinforcement learning's performance with the following assumptions: 1) polices from the past are optimal and 2) source and target agents sharing the same internal representation.

Human Agent Transfer (HAT)

The goal of HAT is to leverage demonstration from a source human or source agent, and then improve agents' performance with RL. Rule transfer is used in HAT to remove the requirements on sharing the same internal approaches' representation between source and target agents. The following steps summarize HAT:

(1) Learn a policy ($\pi$:S|→A) from the source task
(2) Train a decision list upon the learned policy as "IF-ELSE" rules
(3) Bootstrap the target agent's learning with trained decision rules Confidence Human Agent Transfer (CHAT)

CHAT provides a method based on confidence—it leverages a source agent's/human's demonstration to improve its performance.

The confidence measurement in CHAT is the key contribution—it measures the confidence in the source demonstration. Three confidence models are provided: a Decision Tree, a Gaussian Cluster, and a Neural Network. The confidence measurement (uncertainty distribution) is computed using these models during training.

To assist RL, CHAT will leverage the source demonstrations to suggest an action in the agent's current state, along with the calculated confidence through above models. If the calculated confidence is higher than a pre-tuned confidence threshold, the agent executes on that suggested action.

Dynamic Reuse of Prior (DRoP)

This section introduces DRoP, which provides an online confidence based performance analysis on knowledge transfer to boost reinforcement learning, in accordance with various embodiments.

Note that there is existing research using an offline confidence measure of demonstration data, similar to CHAT. In contrast, an improved approach performs online confidence analysis on the demonstrations during the target agent's learning process.

Applicants introduce two types of temporal-difference confidence measurements and three types of action decision models for DRoP: Hard-Decision, Soft-Decision and Soft-Hard-E Decision, which differ by whether the prior knowledge should be used upon the current state of an RL agent.

To implement DRoP in RL domains, in various embodiments, a three step process is described:

(1) Collect a demonstration dataset (state-action pairs). For example, a rudimentary state representation could simply be the colors, positions, etc., of pixels on an interface. In other embodiments, state representation is provided based on a set of extracted features, and a state may be a vector having dimensions based on features being tracked. For example, {(left of pipe, jump right), (on top of pipe, right), (right of pipe, right), . . . }. States can be described based on different features of the environment (e.g., positioning of a pipe sprite).

(2) Train a supervised classifier upon the demonstration dataset. Different types of classifiers could be applied in this step. In an example, Applicants are using a fully connected neural network, and the confidence distribution is calculated through the softmax layer. Variations are contemplated.

(3) Process 1 (e.g., Algorithm 1) is used to assist an RL agent in the target task. The action decision models will decide whether to reuse the transferred knowledge trained in the previous step or to use the agent's own Q knowledge. The online confidence model will be updated simultaneously along with RL's Q function.

As learning goes on, there will be a balance between the transferred knowledge and self-learned Q knowledge. That is, an action decision model will consider the confidence the agent has in all sources of knowledge and select the one most likely to yield high reward. Over time, if the transferred knowledge is sub-optimal, the self-learned Q knowledge will become selected more and more often. Notice that, in some embodiments, Applicants do not directly transfer or copy Q-values in the second step—the demonstrating agent could be completely different from the target agent (e.g., a human can teach an agent). The supervised training step removes any requirements on the source demonstrator's learning process or representation.

Relative to other existing work, there are certain advantages of online confidence measurement:

(1) Remove the offline confidence threshold tuning process. Threshold tuning is usually a trial-and-error or empirical problem and strongly related to the type of tasks. By eliminating this part (parameter tuning), the knowledge transfer framework is more robust and convenient to use.

(2) Use the target agent's experience to measure confidence on demonstrations. DRoP performs the confidence-based performance analysis during the target agent's learning. This online process can help guarantee the transfer knowledge is adapted to the target tasks.

(3) Remove the reuse probability control. The target agent is capable of judging the demonstration knowledge's quality during learning. A global reuse probability control is no longer needed. Note that this is non-trivial because self-decaying reuse probability control is crucial in other knowledge reuse methods to avoid suboptimal asymptotic performance.

FIG. 1A is a block schematic of an example system 100 for interactive reinforcement learning with dynamic reuse of prior knowledge. Various embodiments are directed to different implementations of systems described. One of more processors, operating in conjunction with data storage and memory, implement the components of system 100. As described in various embodiments, combinations of hardware and software operate in conjunction to provide an improved computing mechanism for bootstrapping machine learning architectures.

The system 100 is a demonstrator data set bootstrapping engine that is configured for receiving data sets from one or more demonstrators for conducting improved pre-training of a machine learning model, such as a neural network. In another embodiment, the system 100 includes not only the demonstrator data set bootstrapping engine but also the machine learning model.

The system 100 is adapted for augmenting machine learning with demonstrations, including at least one processor and computer readable memory. The system 100 is implemented using electronic circuits and computer components, and is adapted to pre-train the machine learning model to improve convergence or accuracy based on the demonstrator data sets.

For example, if a naive neural network is the machine learning model, and it is being used to control inputs into a video game, the demonstrator data sets can help bias the initial training cycles of the machine learning model to, among others, avoid "foolish" moves that may be obviously inferior to the demonstrator.

Demonstrator data sets can be provided from human demonstrators, or in some embodiments, from other pre-trained machine learning models (e.g., "machines training machines"), and may include action-state observation pairs.

Demonstrator data sets can be provided in the form of encapsulated data structure elements, for example, as recorded by demonstrator computing unit 122, or observed through recorded and processed data sets of the agent associated with demonstrator computing unit 122 interacting with an environment, and the associated inputs indicative of the actions taken by the agent.

The states of the environment can be observed, for example, by recording aspects or features of the environment. In some embodiments, the state includes image data of an interface. The states may be associated with different rewards/penalties, for example, such as a time-elapsed in a game (e.g., as extracted through optical character recognition from a time-display element), a score (e.g., as extracted through optical character recognition from a score-display element), among others.

In another example, if the agent is being used for game playing where there is a clearly defined win/loss condition, the reward may simply be provided tracked as a 1 for a win and a 0 for a loss. Where the states cannot be directly tied to specific win/loss conditions (e.g., in a board-game where the depth required to analyze victory/failure states are too distant), a proxy reward/penalty may be assigned (e.g., based on a positional evaluation or a heuristic).

The system 100 may include a data receiver 102, an action selection engine 104, a machine learning engine 106, and a model data storage 150. A neural network may be dynamically maintained on model data storage 150, but other types of machine learning models are contemplated.

System 100 may be a computer server-based system, for example, residing in a data center or a distributed resource "cloud computing" type infrastructure. System 100 may include a computer server having at least one processor and configured for dynamically maintaining a model for conducting the one or more sequential tasks and improving the model over a training period to optimize a performance variable through reinforcement learning on a model data storage 150 (e.g., a database).

In an embodiment, system 100 is configured for processing one or more potential contradictions in demonstration data for machine learning, including at least one processor and computer readable memory.

A data receiver 102 is configured for receiving data sets representative of the demonstrations for performing sequential tasks (e.g., playing games, trading stocks, sorting, association learning, image recognition, stock market transaction control). The demonstrator data sets are provided to classifier trainer, which trains a classifier model based on the demonstrator data stored on demonstrator classifier data storage 154.

As there may be differences in quality as between demonstrators and their associated demonstrator data sets, as described in various embodiments, these potential contradictions arise in the form of differing actions that are suggested by at least one of the demonstrator data sets (e.g., from a demonstrator), or from the machine learning model itself.

In some embodiments, data receiver 102 receives demonstrator data sets from multiple demonstrator data sources. For each of the demonstrator data sources, a separate classifier may be established and trained.

The confidence engine 105 is configured as a confidence evaluator engine configured to process the one or more features to determine a confidence score in the demonstrations, the confidence evaluator engine communicating the one or more features for processing by the machine learning model and receiving a signal output from the machine learning model indicative of a confidence score representative of a level of a demonstrator's knowledge as extracted from the one or more features of the demonstration data.

The confidence engine 105 tracks confidence scores associated with each demonstrator data source, and/or portions thereof. In some embodiments, the confidence scores are utilized by the action selection engine 104 which utilizes a selection function to determine an action for the machine learning model to take (e.g., one of the demonstrator classifier indicated actions, or an action indicated by its own internal policy function).

The confidence scores are a distribution that, for example, may be modified based on feedback as obtained from the state observer after an action has been taken (e.g., the action suggested by the demonstrator led to an adverse result, reduce weight on the demonstrator's data sets so that it is less likely to be selected in the future).

In further embodiments, more than one confidence score is assigned to a demonstrator data set, and may be based upon different states/groups of states, and corresponding portions/sub-portions of the demonstrator data sets (e.g., where the demonstrator data set is unevenly adept at various sub-tasks, it may still be valuable for specific sub-tasks, such as an opening as opposed to an endgame).

A machine learning engine 106 processes received inputs and data sets, and iterates a stored model to update the model over a period of time to generate one or more outputs, which may include instruction sets to be transmitted across network 180 to an action mechanism 110.

The outputs as provided in the instruction sets may include actions to be executed that impact the environment, and for example, cause state transitions to occur. The observations may be tracked by a state observer, which may, for example, include display signal tap to record interface display aspects, among others.

The model can include a neural network including a group of nodes interconnected by one or more connections, the group of nodes including at least a subgroup of input nodes, a subgroup of hidden nodes, and a subgroup of output nodes.

An action selection engine 104 is configured to provide a contradiction detection engine configured to process the one or more features by communicating the one or more features for processing by the neural network and receiving a signal output from the neural network indicative of the one or more potential contradictions.

These contradictions, for example, may be indicative of "best practices" that are contradictory. A demonstrator data set may indicate that a correct path to dodge a spike is to jump over it, while another data set may indicate that the correct path is to jump into it. Where there is contradictory actions, for example, the action selection engine 104 may generate a control signal indicating a specific action to be taken.

As described in various embodiments herein, the action selection engine 104 is configured to determine a next action based on a selection process as between an action posited by one or more demonstrators (e.g., through the demonstrator data sets); or through the machine learning model stored in model data storage 150 (e.g., a Q-learning policy).

Confidence scores are maintained for each of the demonstrator data sets or portions thereof, and can be updated periodically based on selected actions and their observed states and associated outcomes.

After an action is executed, machine learning engine 106 observes the outcome and associated rewards/states, and updates the machine learning model stored in model data storage 150. Accordingly, where the demonstrator data set is used as the action-source, it may, in some cases, override the machine learning model stored in model data storage 150. The determination of whether the demonstrator data set overrides the machine learning model is based on an actor-source selection mechanism, which utilizes the maintained confidence scores.

Accordingly, in some embodiments, the confidence (e.g., weight) associated with demonstrator data sets is updated over time. As the machine learning model progresses, the action-decision models and their associated determinations as it relates to actor-source for actions (e.g., decision to use demonstrator "knowledge" or the model's own "knowledge") may shift in proportion as the machine learning model is improved over training epochs.

In some embodiments, the mechanism utilizes decision models whereby weights are automatically shifted over time towards the model's own internal policies and interconnections become more adept at achieving rewards. For example, as a chess-controlling machine learning agent improves its ability to play chess, the value of human/machine demonstrator data sets becomes diminished, as reflected through the confidence scores and accordingly, the weights assigned to the demonstrator data sets during action-source determination.

A learning speed monitoring engine 108 is configured, in some embodiments to track the progress of the machine learning model in achieving rewards, tracked in training performance storage 152. In an embodiment, responsive to identification that the ability of the machine learning model to obtain rewards has not improved in a number of epochs (e.g., indicating that a convergence is not occurring quickly enough or not at all), a notification is generated requesting additional demonstrator data to help the machine learning model improve.

For example, the machine learning model may be "stuck in a rut," and additional demonstrator data may be helpful. The machine learning model progress may be tracked through analyzing the rate of change upon which rewards are being achieved, or derivatives thereof (e.g., acceleration or higher order derivatives).

The action selection engine 104 is configured to associate one or more weights with one or more data elements of the one or more data sets linked to the one or more contradictions, the one or more weights modifying the processing of the one or more data elements of the one or more data sets when training the machine learning model to improve the model over the training period.

Figure 1B:
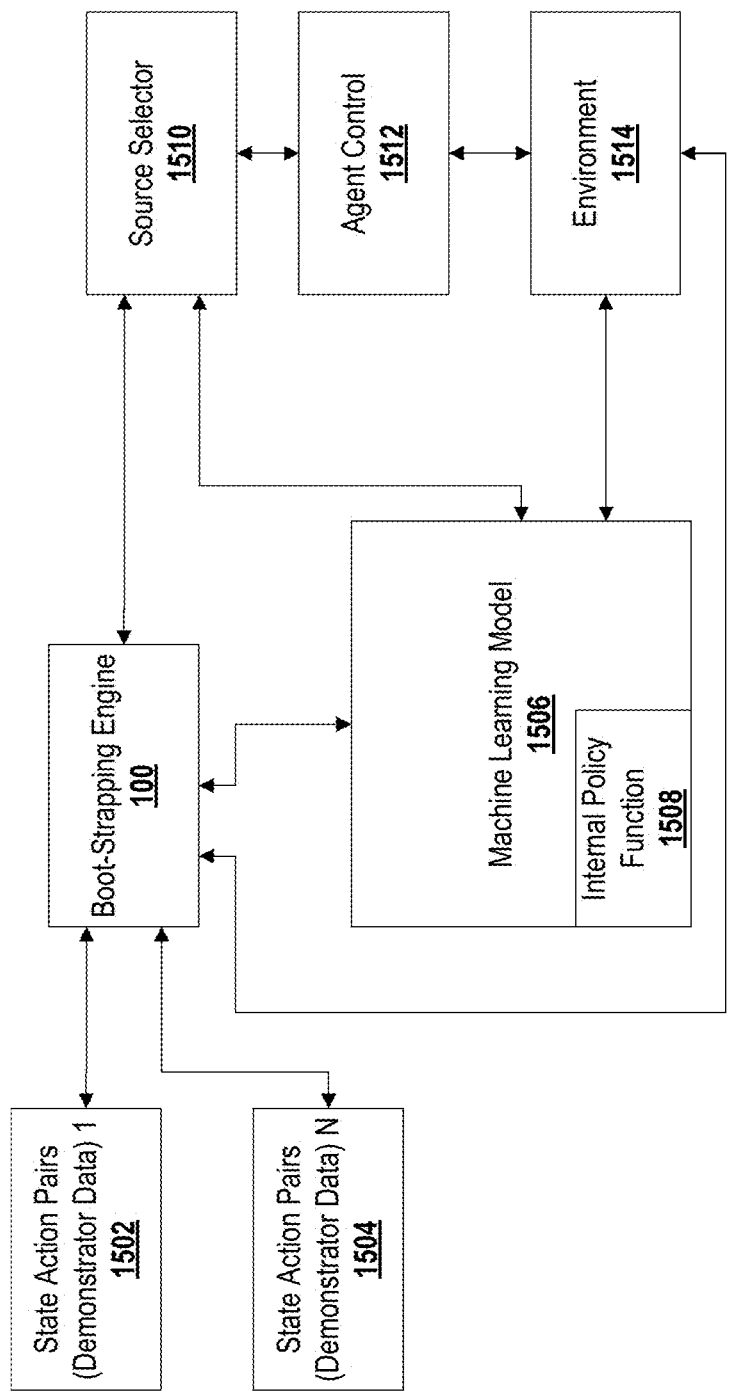
FIG. 1B is an example block schematic diagram of the bootstrapping engine operating in conjunction with a machine learning model, according to some embodiments.

FIG. 1B is an example block schematic diagram of the bootstrapping engine operating in conjunction with a machine learning model, according to some embodiments.

In this example, the demonstrator data sets 1502 and 1504 are provided to the bootstrapping engine 100. The bootstrapping engine is adapted for interoperation with the machine learning model through source selector 1514, and maintains trained classifiers that are classified using the demonstrator data sets 1502 and 1504. For example, a neural network could be designed and deployed to accomplish a task, such as playing a video game. A user may wish the network to perform better or to be used in a different setting (e.g., a variation on the same game, or a different game in the same genre). In this case, the bootstrapping engine, along with demonstrations, can allow the neural network to train faster and/or reach higher final performance, relative to not using the bootstrapping engine.

The source selector 1510 is configured as an action selection mechanism (e.g., a switch) that selects between the actions posited by the trained classifiers corresponding to the demonstrator data and an internal policy function 1508. The source selector 1510 provides control signals to agent control 1512, executing actions upon environment 1514. The current state/state changes of environment 1514 are monitored and recorded and provided back to machine learning model 1506 for updating the model in accordance with feedback.

In accordance with the FIG. 1B, the bootstrapping engine 100 can be provide separately as a retrofit to an existing machine learning model 1506 to help bias and train the machine learning model 1506 to achieve convergence/improve performance faster using the aid of demonstrator data sets. This is useful where a demonstrator is able to efficiently indicate to the machine learning model 1506 the correct set of actions, to reduce lost cycles that would otherwise arise from the machine learning model 1506 attempting inadvisable strategies.

However, as noted in some embodiments, the demonstrator data set based actions are dynamically applied, and in some situations, based on a tracked confidence level, the internal policy function 1508 begins to dominate over the trained classifiers in determining which actions to take. Accordingly, as the machine learning model 1506 improves performance, there may be an automatic down-weighting of the demonstrator data set based actions.

Figure 1C:
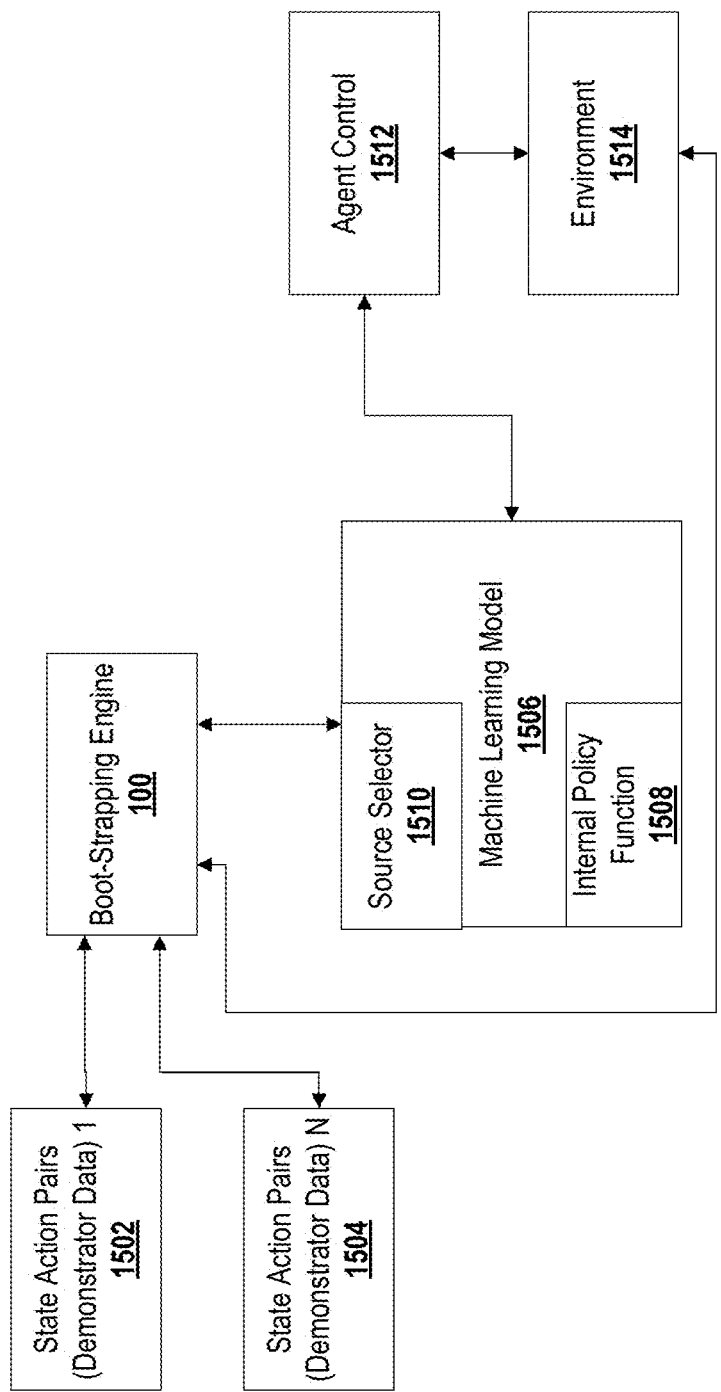
FIG. 1C is an alternate example block schematic diagram of the bootstrapping engine operating in conjunction with a machine learning model, according to some embodiments.

FIG. 1C is an alternate example block schematic diagram of the bootstrapping engine operating in conjunction with a machine learning model, according to some embodiments. In this alternate embodiment, the machine learning model 1506 incorporates source selector 1510 and a separate source selector 1510 mechanism is unnecessary.

Figure 1D:
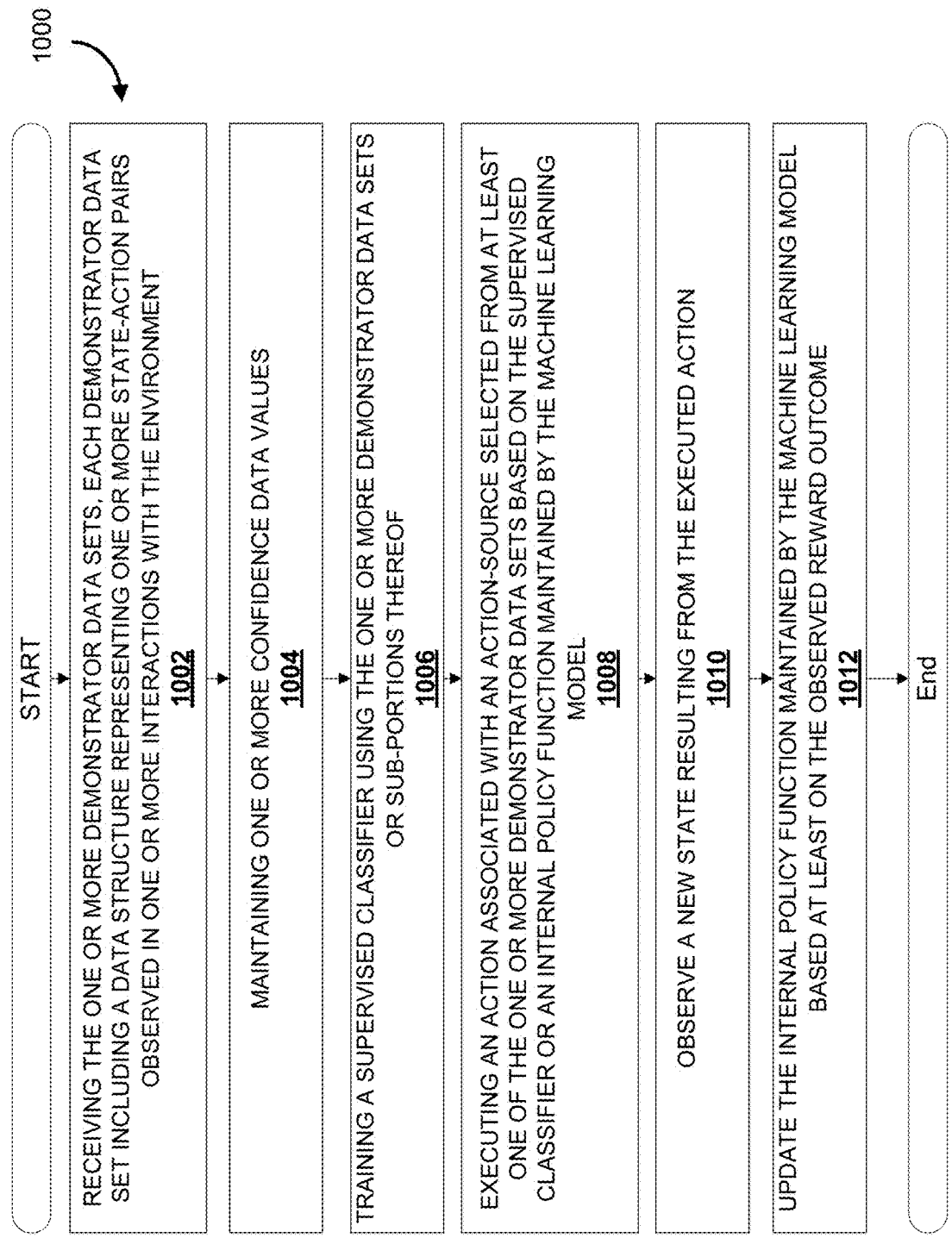
FIG. 1D is an example method diagram showing an example process for training machine learning models with demonstration data for deep reinforcement learning, according to some embodiments.

FIG. 1D is an example method diagram showing an example process for training machine learning models with demonstration data for deep reinforcement learning, according to some embodiments.

A method 1000 of biasing (e.g., selectively/dynamically biasing for bootstrapping learning) a machine learning model using one or more demonstrator data sets is provided in example steps below. The steps may be provided in various orders, and alternate, different, other steps are contemplated. The method 1000 controls one or more actions conducted by an agent in an environment which transitions between one or more states.

The method includes, at 1002, receiving the one or more demonstrator data sets, each demonstrator data set including a data structure representing one or more state-action pairs observed in one or more interactions with the environment. The demonstrator data sets can be obtained, for example, by human demonstrators, or machine-based demonstrators. The state-action pairs include actions (e.g., inputs, such as those to a Mario™ game), and states of the environment (e.g., for a Mario™ game, the output of a screen). The states can be associated with rewards (e.g., for a Mario™ game, the score).

For each demonstrator data set or sub-portions thereof, (e.g., periodically updating) one or more confidence data values is maintained at 1004. Supervised classifiers are trained using the one or more demonstrator data sets or sub-portions thereof at 1006, and an action is selected from an action-source selected from at least one of the one or more demonstrator data sets or an internal policy function maintained by the machine learning model, the selecting based at least upon the one or more confidence data values at 1008. At 1010, the impact of the selected action is observed in the environment, and at 1012, the internal policy of the machine learning model is updated based on reward/penalty outcomes.

As described in various embodiments below, there are variations for confidence determination, as well as actor-source selection for action execution. Some embodiments contemplate utilizing the actor-source selection to discriminate not only as between the demonstrator data sets and the machine learning model, but also as between demonstrator data sets, or portions of demonstrator data sets (e.g., a demonstrator may be good at a first sub-task but not so good at a second sub-task).

Furthermore, in some embodiments, the actor-source selection discriminates as between multiple demonstrator data sets/portions thereof, and the machine learning model (e.g., a bootstrapping engine configured to receive data sets from multiple demonstrators).

An example of multiple demonstrators could include a series of chess game data sets from varying levels of skill (e.g., strong amateur vs. grandmaster), specialities (e.g., defensive play, positional play, openings, middle-game, end-game, evolutional play), human demonstrators (e.g., Bobby Fischer games), machine demonstrators (e.g., Stockfish™ games), among others. Accordingly, the actor-source selection may include simultaneous maintenance of confidence scores for each demonstrator, for which actions may be selected from.

As not all demonstrators are equally good at all sub-tasks that form part of the task being optimized by the learning model, in some embodiments, different confidence scores for the demonstration sets are assigned based upon specific states, features of states, or groups of states.

For example, a demonstrator may be particularly good at opening states (which have a level of broad positional analysis, a challenging task for machine learning without bootstrapping based on demonstrators), but not so good at endgame states, where the machine-learning model is able to easily dominate by extending endgame tables.

Accordingly, the mechanism of some embodiments is biased to prefer demonstrator source actions where the environment is in one of the opening states, and to prefer its own internal Q-learning policy where the environment is in one of the endgame states.

Temporal Difference Confidence Analysis

The online confidence metric is measured via a temporal difference (TD) approach. For each action source, Applicants built a TD model to measure the confidence-based performance via experience. An action source is defined by where an agent gets its action from. That is to say, in the current state, if an RL agent chooses an action by arg max Q(s, a), the corresponding action source is its learned Q-value. But if an RL agent follows the recommendation of an action from its prior knowledge (i.e., the demonstrator's action), the action source would then be the prior knowledge.

A TD-based confidence model is used to analyze the confidence level of every action source with respect to every state. Once an action is executed, the confidence model will update the corresponding action source's confidence value.

Generally speaking, an RL agent should prefer the action source with higher confidence level: the expected reward would likely be higher by taking the action from that source.

A dynamic TD confidence model is defined as follows:

$$C(s) \leftarrow (1-F(\alpha))XC(s)+F(\alpha)X[F(r)+\gamma XC(s')]$$

where $\gamma$ is discount factor, r is reward, and $\alpha$ is the update parameter. The optimal convergence of such TD iteration can be proved. For continuous domains, function approximators such as tile coding or neural networks should be used—in this work Applicants are using the same discretization approximator as Q(s, a).

Applicants define two types of knowledge models: "confidence prior knowledge model" and "confidence Q knowledge model." Both models are discussed next.

The confidence prior knowledge model is denoted by CP(s). Applicants have 2 update methods: Dynamic Rate Update (DRU), and Dynamic Confidence Update (DCU). For DRU, since this example of DRoP uses a neural network for supervised classification, Applicants define a dynamic updating rate based on softmax layer's classification distribution:

$$F(\alpha) = \alpha \times \max \left\{ \frac{1}{\sum_i \exp(\theta_i^T \cdot x)} \begin{bmatrix} \exp(\theta_1^T \cdot x)) \\ \exp(\theta_2^T \cdot x)) \\ \ldots \\ \exp(\theta_i^T \cdot x)) \end{bmatrix} \right\}$$

The update of rate CP(s) will be bounded by the confidence of the corresponding classification. If the confidence is higher, the update rate will be larger (and vice versa). In some embodiments, Applicants use the original reward from the learning task: F(r)=r.

For DCU, Applicants can apply a fixed update rate: $F(\alpha)=\alpha$, but the reward function is leveraging the confidence:

$$F(r) = \frac{r}{r\_max} \times \max \left\{ \frac{1}{\sum_i \exp(\theta_i^T \cdot x)} \begin{bmatrix} \exp(\theta_1^T \cdot x)) \\ \exp(\theta_2^T \cdot x)) \\ \ldots \\ \exp(\theta_i^T \cdot x)) \end{bmatrix} \right\}$$

In the above equation, $$\frac{r}{r\_max}$$

is normalized reward (r_max denotes the maximum absolute reward value) and F(r) re-scales the reward using confidence distribution.

The confidence Q knowledge model is denoted by CQ(s). CQ(s) uses the same update methods as above, except that, in some embodiments, the confidence is always set to 1 since there is no classification confidence distribution. The update rate (F(α)=α) is constant, but that does not mean CQ(s) works the same way as Q(s, a). CQ(s) will be updated only if an action is provided through Q(s, a).

In contrast, Q(s, a) will always get updated whenever an action is executed. That is why Applicants treat Q(s, a) as global learned policy, whereas CQ(s) measures how good that learned policy is (i.e., the confidence of learned Q knowledge). CQ(s) is also different from the value function V(s). V(s) would be updated through a consecutive sequence of states while CQ(s) gets updated only when the corresponding action source is used.

Action Selection Methods

Given these TD-based confidence models, Applicants introduce three action selection methods that balance an agent's learned knowledge (CQ) with its prior knowledge (CP), and variations thereof.

The hard decision model (HD) is greedy and attempts to maximize the current confidence expectation. Given current state s, action source AS is selected as:

$$AS = \arg\max[\{CQ(s), CP(s)\}],$$

where ties can be broken randomly (or through other mechanisms).

The soft decision model (SD) is shown in Process 2 (e.g., Algorithm 2).

In contrast to the hard decision model, the soft decision model normalizes CQ(s) and CP(s) using the hyperbolic tangent function.

This normalization step maps all possible C values to a smooth curve, bounded by [−1,1], making comparisons between values of different magnitudes more convenient. The normalization is done as follows:

$$\tanh(rCQ) = \frac{e^{rCQ} - e^{-rCQ}}{e^{rCQ} + e^{-rCQ}}$$

The action source, AS, is then decided using the probability distribution (line 4 of Process 2) as:

$$AS = \begin{cases} Q & P = \frac{\tanh(rCQ) + 1}{\tanh(rCP) + \tanh(rCQ) + 2} \\ Prior & P = \frac{\tanh(rCP) + 1}{\tanh(rCP) + \tanh(rCQ) + 2} \end{cases} \quad (1)$$

If the confidence in the prior knowledge is high, the target agent would follow the prior with high probability. If the confidence in the prior knowledge is low, it might still be worth trying, but with lower probability. If the confidence in the prior knowledge is very low, the probability would then be almost zero.

Notice that the normalization step helps ensure the method can be adapted in many different RL settings.

For example, if learning parameters or reward functions are very different, the learned Q-values and C-values will also be really different. Regardless of the scale or magnitude of those values, the SD model could use the above normalization probabilistic model to directly handle all kinds of distribution without modifying the learning process.

The third model is the soft-hard-ε decision model (S-H-ε), shown in Process 3 (e.g., Algorithm 3). This method takes advantages of the above two models by adding an ε-greedy switch. That is to say, Applicants have added an ε-greedy policy over HD and SD: S-H-ε can both greedily exploit the confidence value and also perform probabilistic exploration. Notice that the method could also handle multiple-source demonstrations.

By adding parallel prior models, the above AS (in Equation 1) could be expanded into multi-cases:

$$AS = \begin{cases} Prior_1 & P_1 = \frac{\tanh(rCP_1) + 1}{\sum_i \{\tanh(rCP_i) + 1\}} \\ Prior_2 & P_2 = \frac{\tanh(rCP_2) + 1}{\sum_i \{\tanh(rCP_i) + 1\}} \\ \cdots & \cdots \\ Prior_i & P_i = \frac{\tanh(rCP_i) + 1}{\sum_i \{\tanh(rCP_i) + 1\}} \end{cases} \quad (2)$$

Experiment Setup

In this section, two experiment domains and experimental methodology will be introduced.

Experiment Domains

In Applicants evaluate example approaches in two domains: Cartpole™ and Mario™.

Figure 1E:
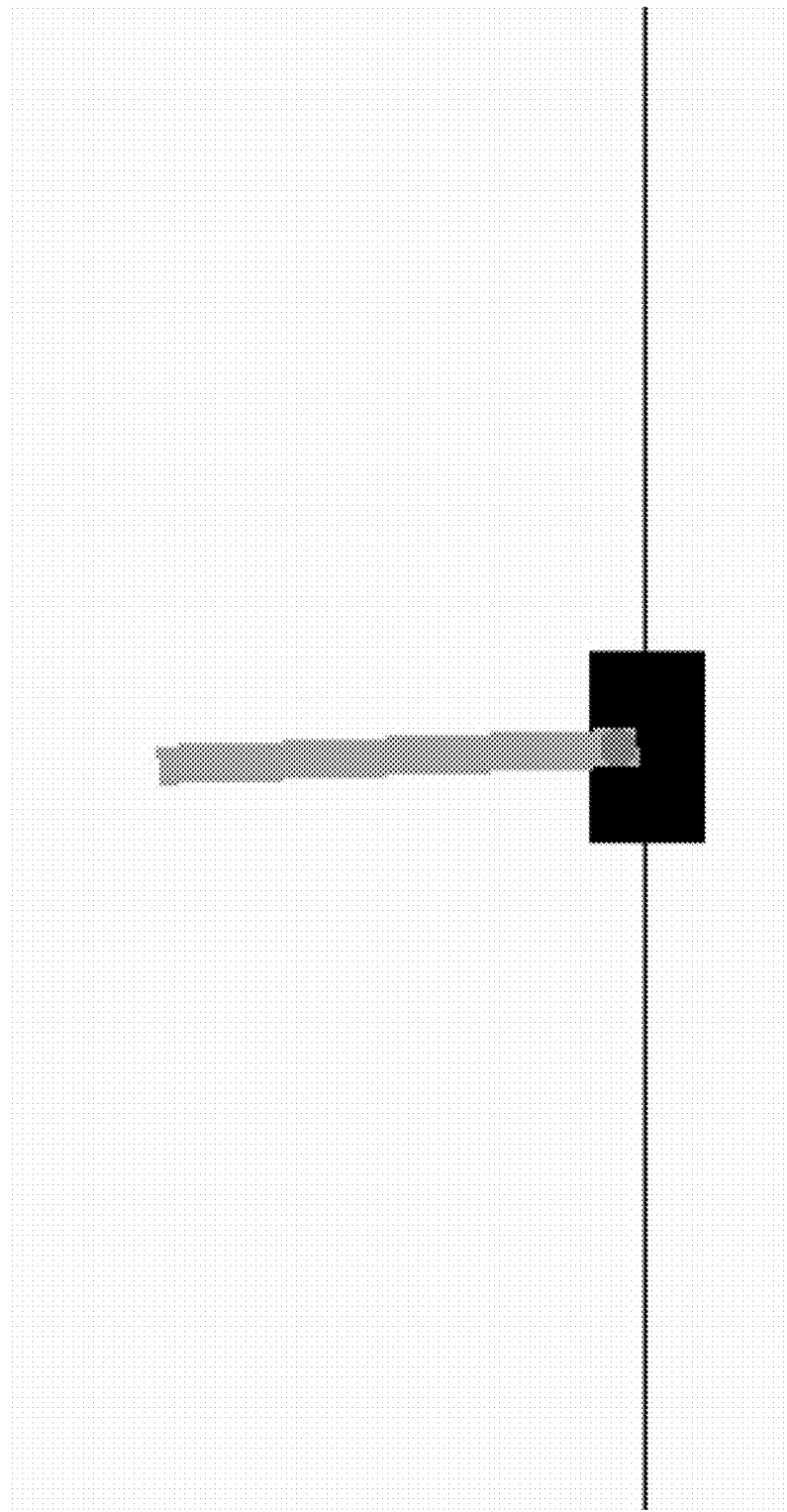
FIG. 1E is a screenshot depicting a game (Cartpole™) that can be used for machine learning, according to some embodiments.

Cartpole™ is a classic balance control problem game. The Cartpole™ simulation is based on the open-source OpenAI Gym. A screenshot of the simulation 100E is shown in FIG. 1E. This task has a continuous state space; the world state is represented as 4-tuple vector: position of the cart, the angle of pole, and their corresponding velocity variables. There are two actions for the cart: move left or move right. Cartpole™'s reward function is designed as: +1 for every surviving step and −500 if the pole falls. The goal is to train a RL agent balancing a light-weight pole hinged to that cart.

Mario™ is a benchmark domain, based on Nintendo's Mario Brothers™. In this simulation, Applicants train the Mario agent to score as many points as possible.

To guarantee the diversity and complexity of tasks, the simulation world is randomly sampled from a group of one million similar worlds. The world state is represented as a 27-tuple vector, encoding the agent's state/position information, surrounding blocks and enemies.

There are three groups of actions: moving—{no direction, left, right}, jumping—{don't jump/jump}, and acting—{run/fire, don't run/fire}. A real-time action is then generated by simultaneously selecting one sub-action from each of the three groups, and there are 12(3×2×2) different actions in total.

An example process for DRoP for target learning bootstrap is provided below.

| Algorithm 1: DRoP: Target Learning Bootstrap |
|---|
| Input: Prior knowledge model PM |
| 1    for each episode do |
| 2        Initialize state s to start state |
| 3        for each step of an episode do |
| 4            if rand( ) ≤ ε then |
| 5                %Exploration: |
| 6                a ← random action |
| 7            else |
| 8                %Action source selected via HD, SD, or S-H-ε: |
| 9                AS ← Action Decision Model |
| 10                if AS == Prior Knowledge then |
| 11                    a ← action front Prior Knowledge |

Algorithm 1: DRoP: Target Learning Bootstrap

```
12   |   |   |   |   Update PC
13   |   |   | else
14   |   |   |   |   a ← action that maximizes Q
15   |   |   |   |_  Update QC
     |   |   |_
16   |   |   Execute action a
17   |   |   Observe new state s' and reward r
18   |   |_  Update Q (SARSA, Q-Learning, etc.)
     |_
```

An example process for a soft decision model is provided below.

Algorithm 2: SD: Soft-Decision Model

```
Input: CQ, CP, State s
1  R = max{|CQ(s)|, |PQ(s)|}
2  rCQ = CQ(s)/R
3  rCP = PQ(s)/R
4  if rand( ) ≤ (tanh(rCQ)+1) / (tanh(rCP)+tanh(rCQ)+2); then
5  |  %Action source:
6  |  AS = Prior Knowledge
7  else
8  |  % Action source:
9  |_ AS = Q Knowledge
10 return AS
```

An example process for a hard-soft-ε decision model is provided below.

Algorithm 3: S-H-∈: Hard-Soft-ε Decision Model

```
Input: CQ, CP, State s
1  R = max{|CQ(s)|, |PQ(s)|}
2  rCQ = CQ(s)/R
3  rCP = PQ(s)/R
4  if rand( ) ≤ ε then
5  |
       if rand( ) ≤ (tanh(rCQ)+1) / (tanh(rCP)+tanh(rCQ)+2) then
6  |  |  %Action source:
7  |  |  AS = Prior Knowledge
8  |  else
9  |  |  %Action source:
10 |  |_ AS = Q Knowledge
11 else
12 |  %Action source:
13 |_ AS = arg max[{CQ(s), CP(s)}]
14 return AS
```

Figure 1F:
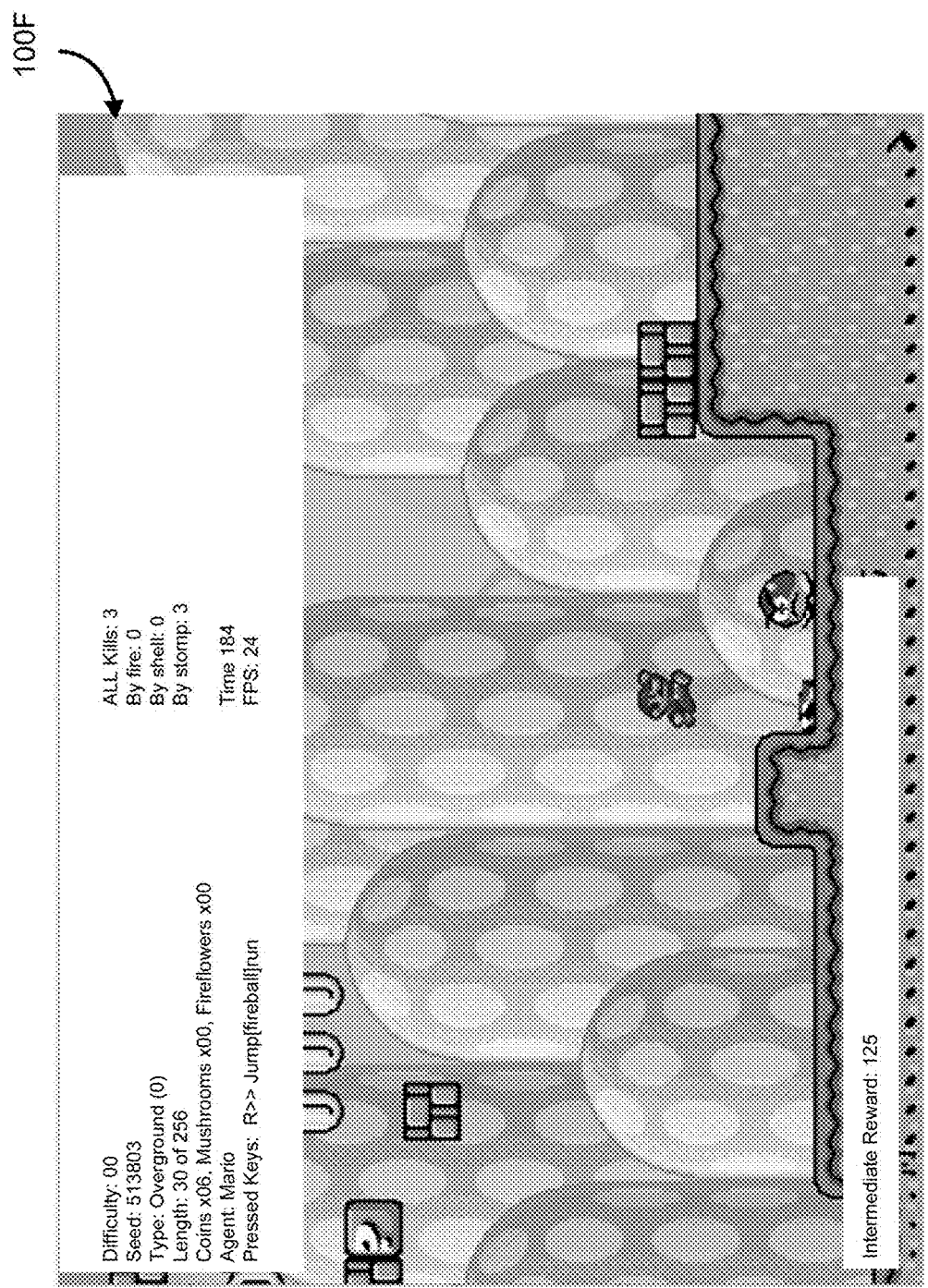
FIG. 1F is a screenshot depicting a game (Marion™) that can be used for machine learning, according to some embodiments. The screenshot includes a number of annotations used for tracking machine learning progress and outcomes.

FIG. 1F is a screenshot 100F depicting a game (Mario™) that can be used for machine learning, according to some embodiments. The screenshot includes a number of annotations used for tracking machine learning progress and outcomes.

Methodology

DRoP can work with demonstrations collected from both humans and other agents. In the experiments, demonstrations are collected either from a human via a simulation visualizer, or directly from an agent executing the task.

Backpropagation is used to train a neural network with two hidden layers on the demonstration datasets. Applicants used a "4-15-15-2" network (15 nodes in two hidden layers) network in Cartpole™ and a "27-50-50-12" network in Mario™, to be consistent with past work.

To benchmark against CHAT, Applicants used the same networks as the confidence models used by DRoP.

To benchmark against HAT, J48 is used to train decision rules. The classifiers are trained using classification libraries provided by Weka 3.8, for example.

For both CHAT and HAT, the self-decaying reuse probability control parameter φ was tuned to be 0.999 in Cartpole™ and 0.9999 in Mario™.

Target agents in both Cartpole™ and Mario™ are using 0-learning process. In Cartpole™, Applicants use α=0.2, γ=0.9, ε=0.1. In Mario, Applicants use $$\alpha = \frac{1}{10 \times 32},$$

γ=0.9, ε=0.1.

These parameters are set to be consistent with previous approaches in these domains. For the confidence model of prior knowledge in DRoP, the dynamic updating rate of α is determined by the output softmax layer.

Experiments are evaluated in terms of learning curves, the jumpstart, the total reward, and the final reward. Jumpstart is defined as the average initial performance improvement, compared to an RL agent with no prior knowledge.

The total reward accumulates scores every 5 percent of the whole training time. All experiments are averaged over 10 trials and T-tests are performed (over 10 learning trials) to evaluate the significance. Error bars on the learning curves show the standard deviation.

Experimental Results

This section will present and discuss main experimental results. Applicants first show the improvement over existing knowledge reuse algorithms, HAT and CHAT, as well as baseline learning. Then, Applicants show DRoP is capable of leveraging different quality demonstrations and demonstrations from multiple sources. Finally, Applicants will evaluate how DRoP could achieve interactive RL by efficiently involve human demonstrator in the loop.

Improvement Over Baselines

In Cartpole, Applicants first let a trained agent demonstrate 20 episodes (average number of steps: 821±105) and record those state-action pairs. In Mario, Applicants let a trained agent to record 20 episodes of demonstrations (average reward: 1512±217).

DRoP is then used with these demonstration datasets. As benchmarks, Applicants run HAT and CHAT on the same datasets, and Q-learning is run without prior knowledge. Learning performance is compared in Table 1. DRoP with different models outperform other baselines.

The top two scores for each type of performance are underlined and in particular DRoP with DRU and S-H-ε model has achieved the best learning result and further discussions in the next sections use this setting. Statistically significant ($p<10^{-4}$ via t-tests) improved scores in Table 1 are in bold and Applicants can see that there is no significant difference ($p>0.05$ via t-tests) from CHAT and HAT, for the final reward of Mario.

Figure 2:
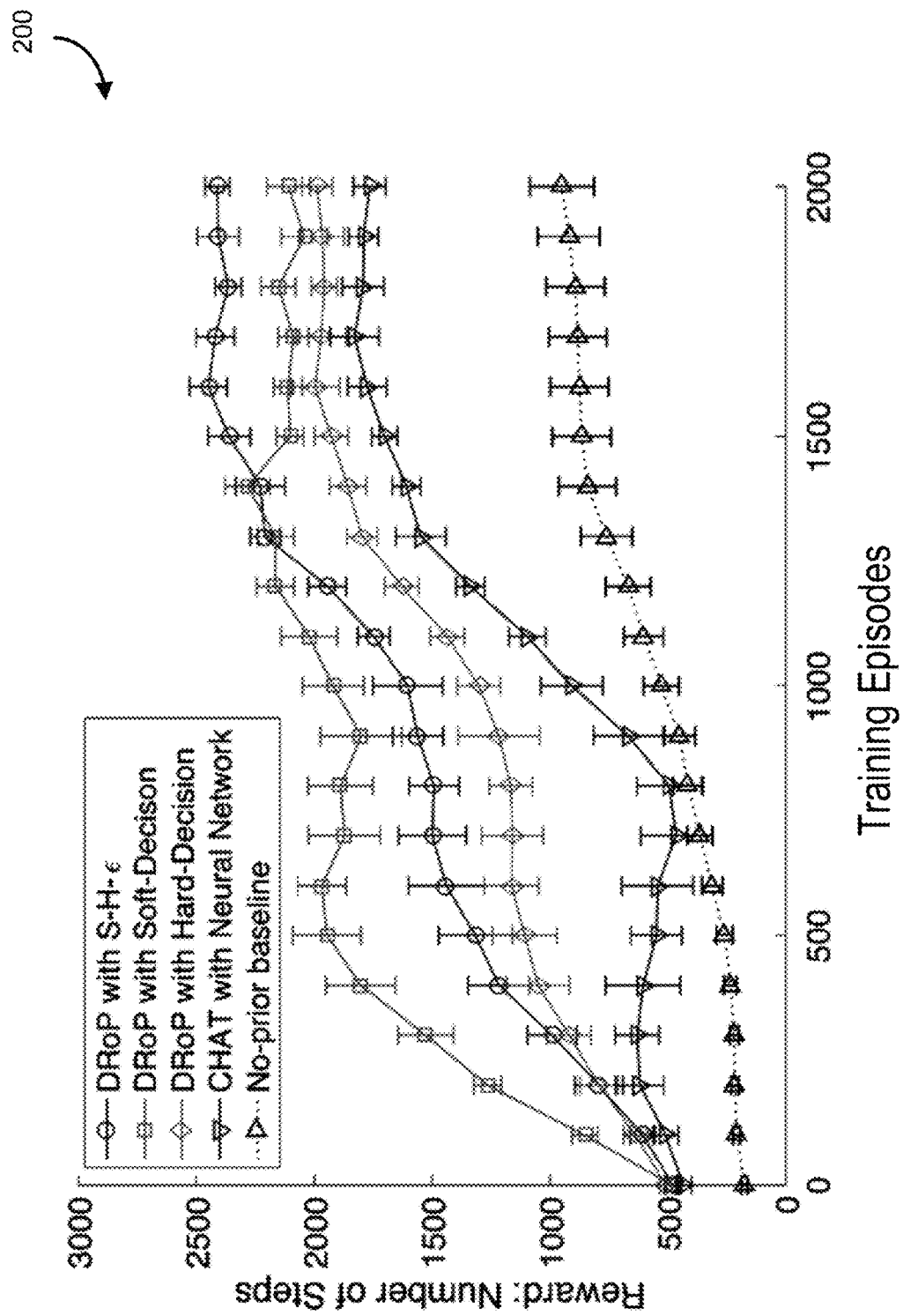
FIG. 2 is a graph illustrating a comparison of learning curves of DRoP, CHAT and baseline RL in Cartpole™, according to some embodiments.
Figure 3:
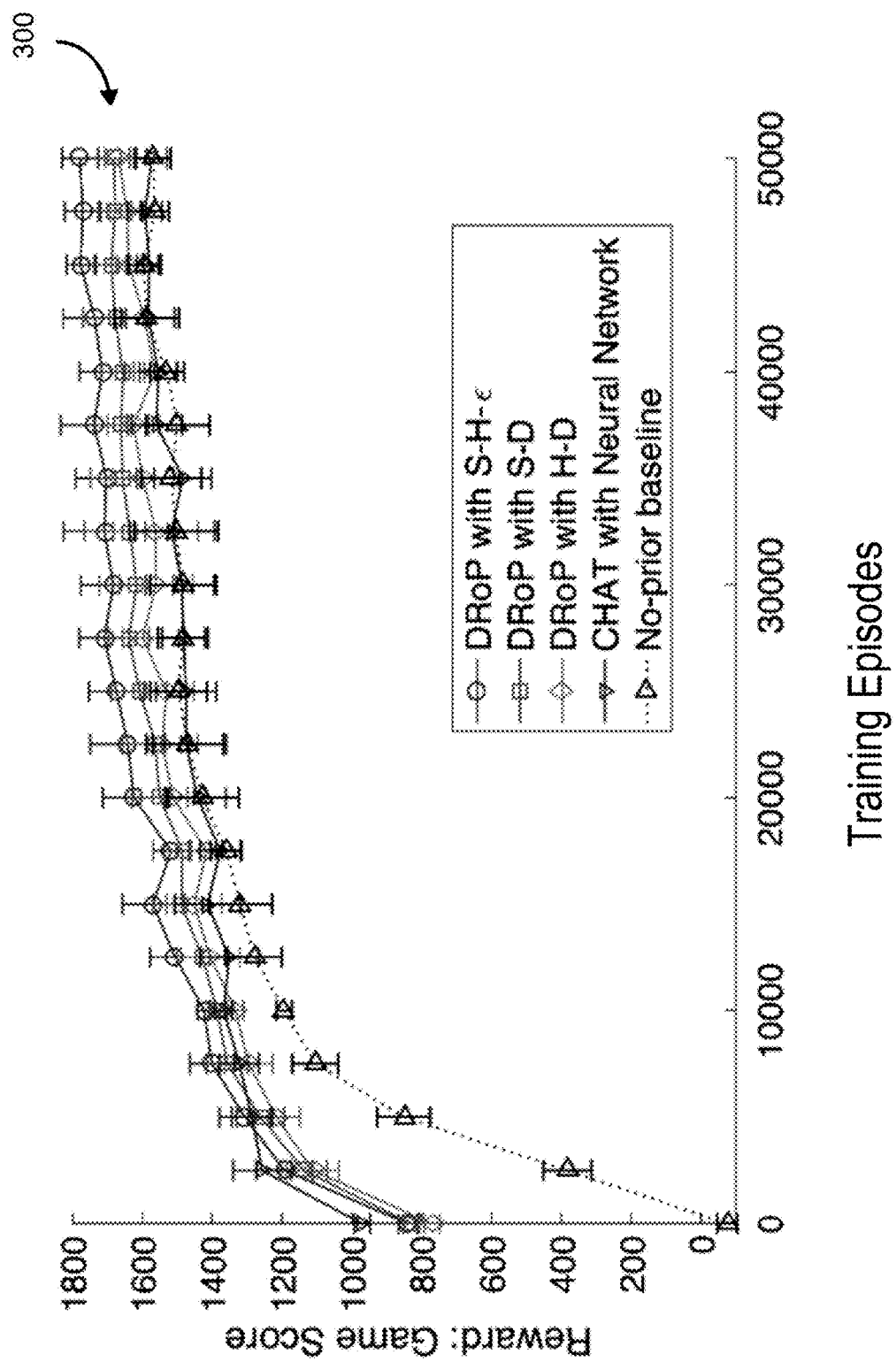
FIG. 3 is a graph illustrating a comparison of learning curves of DroP, CHAT and baseline RL in Mario™, according to some embodiments.

To highlight the improvement, FIG. 2 and FIG. 3 show the learning curves of DRoP using DRU method. All three action selection schemes of DRoP (DRU) outperform HAT, CHAT and baseline learning, indicating that the dynamic online confidence-based transfer (DRoP) is more effective compared to offline confidence transfer.

FIG. 2 is a graph 200 illustrating a comparison of learning curves of DRoP, CHAT and baseline RL in Cartpole™, according to some embodiments.

FIG. 3 is a graph 300 illustrating a comparison of learning curves of DroP, CHAT and baseline RL in Mario™, according to some embodiments.

Figure 4:
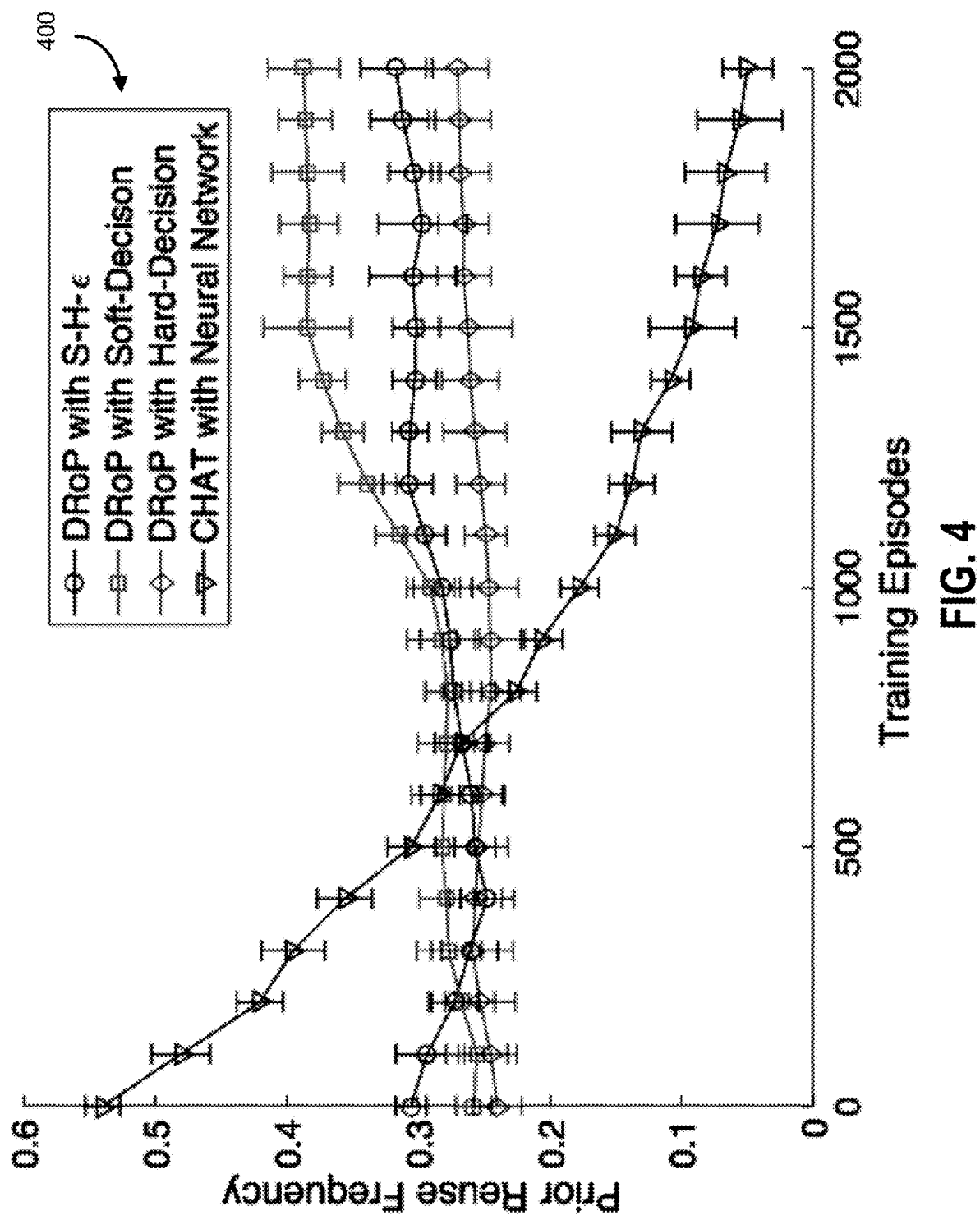
FIG. 4 is a graph illustrating an actual reuse frequency of prior knowledge using DRoP and CHAT in Cartpole™, according to some embodiments.

FIG. 4 is a graph 400 illustrating an actual reuse frequency of prior knowledge using DRoP and CHAT in Cartpole™, according to some embodiments. FIG. 4 shows how often prior knowledge is reused, highlighting the difference between DRoP and CHAT. Because CHAT does not perform online confidence analysis, a self-decaying probabilistic parameter is used to control the reuse frequency of transferred prior knowledge.

If the prior knowledge is imperfect (as is often the case), the target agent may be constrained by the prior knowledge (subject to the decaying probability). It is possible that the target agent will therefore execute suboptimal actions repeatedly.

Considering both FIG. 2 and FIG. 4, Applicants can see that as the reuse probability decays, the performance of CHAT dips, suggesting the agent must re-explore and re-learn to outperform the previously learned (suboptimal) knowledge. In contrast, DRoP allows the target agent to always perform online confidence-based performance analysis on the prior knowledge when it is used. Even if the agent is learning something bad, it has the ability (through the Action Decision Model) to avoid repeating the same decision next time.

Figure 5:
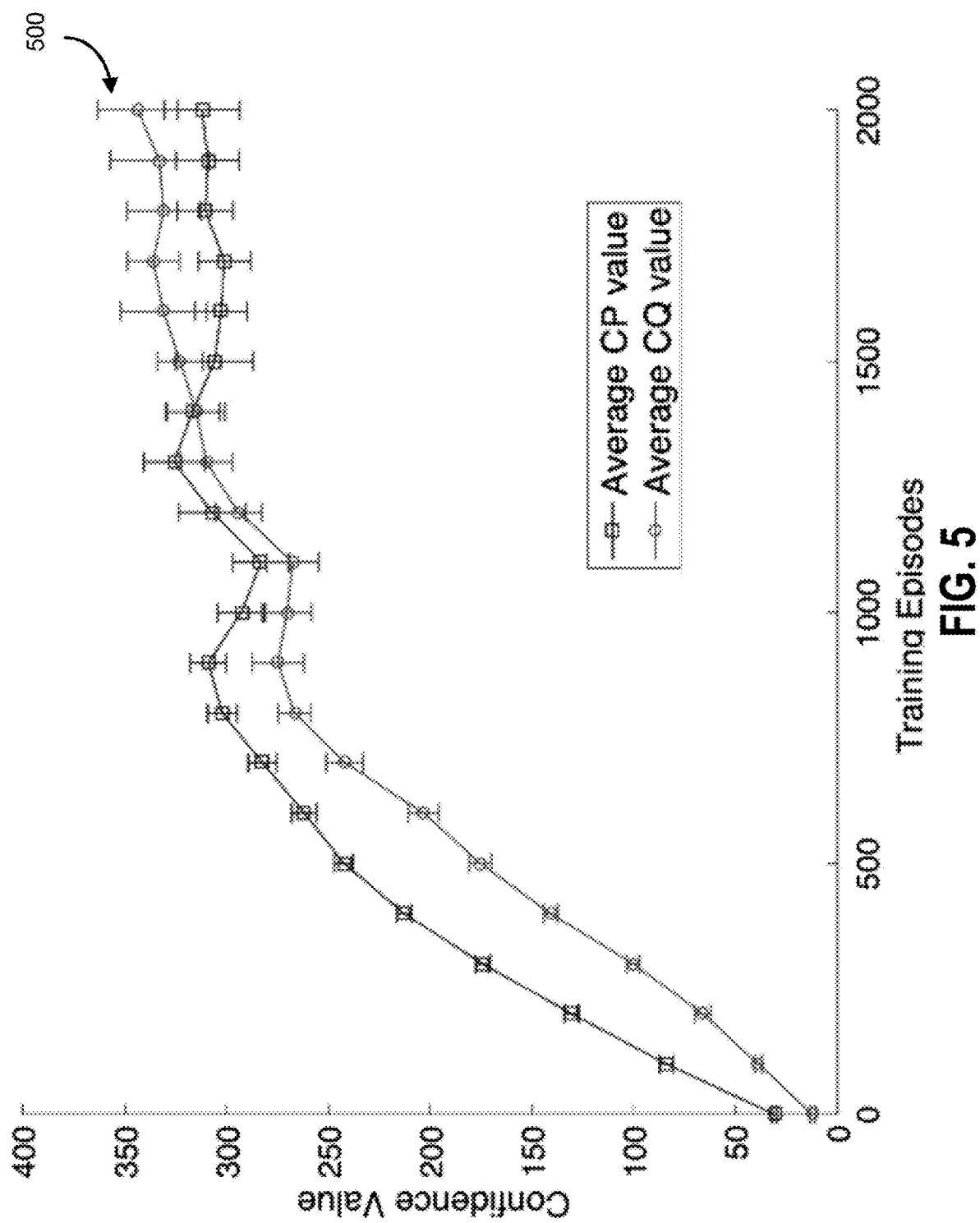
FIG. 5 is a graph illustrating confidence values of Prior (CP) and Q (CQ) during learning in Cartpole™ using S-H-ε action selection, according to some embodiments.

FIG. 5 is a graph 500 illustrating confidence values of Prior (CP) and Q (CQ) during learning in Cartpole™ using S-H-$\varepsilon$ action selection, according to some embodiments. FIG. 5 shows the agent's confidence in the prior knowledge and its Q knowledge during learning. These curves represent the averaged CP(s) and CQ(s) value over encountered states. At the early stage of learning, CP(s) is relatively higher, indicating that transferred knowledge does help the agent select good actions. Besides, CQ(s) surpasses CP(s) at the end, indicating that agent could learn to outperform the demonstrator.

Even though the reuse probability is relatively low at the start (relative to CHAT), that does not mean transferred knowledge is wasted. Instead, DRoP can quickly learn to select the most beneficial parts of the prior knowledge to reuse. Put differently, the target agent learns to outperform demonstrations rather than simply learning to reproduce them. As the agents approach convergence, DRoP agents still maintain a certain amount of prior knowledge (which truly helps) while CHAT agents almost have nothing left, leading to significantly improved performance at convergence by DRoP ($p<10^{-9}$ via t-tests).

DRoPing Low-Quality Demonstrations

As mentioned in the previous section, DRoP is capable of eliminating the side effects of suboptimal demonstrations. Applicants therefore consider using poor demonstrations to see how well the online confidence-based analysis mechanism can handle poor data.

Here, Applicants have five different groups of demonstrations (recorded from different agents), ranging from completely random to high performing (shown in Tables 2 and 3).

The approach taken by Applicants first evaluated the method individually with the five demonstration datasets. Cartpole™ results are shown in Table 2 and Mario results are shown in Table 3. As Applicants have observed, the quality of the demonstration does effect performance, and better demonstrations lead to better performance.

However, what is more important is whether poor demonstrations hurt learning. If one observes the results of using randomly generated demonstrations, Applicants found that even if the jumpstart is negative (i.e., the initial performance is hurt by using poor demonstrations), the final converged performance is almost the same as learning without the poor demonstrations.

In addition, the converged reuse frequency (average percentage of actions using the prior knowledge) of random demonstration is almost zero, which means the DRoP agent has learned to ignore the poor demonstrations.

Also, for a low-performance demonstration (L1 in Table 2), the final reuse frequency is relatively smaller than that of a high-performance demonstration (L4), showing that DRoP learns to use demonstrations that are higher-quality.

TABLE 1

This table compares baselines (Methods 1 to 3) with DRoP using different models (Methods 4 to 9). Jumpstart, total reward and converged final reward are shown. The top two scores of each column are underscored and significant improvement over Q-learning in bold.

| | Cartpole | | | Mario | | |
|---|---|---|---|---|---|---|
| Method | Jumpstart | Total Reward | Final Reward | jumpstart | Total Reward | Final Reward |
| Q-Learning | N/A | 11653 | 951 ± 36 | N/A | 27141 | 1569 ± 51 |
| HAT | 225 | 16283 | 1349 ± 84 | 651 | 25223 | 1577 ± 49 |
| CHAT | 258 | 22692 | 1766 ± 68 | 1046 | 30144 | 1574 ± 46 |
| DCU, H-D | 298 | 29878 | 1994 ± 62 | 829 | 31021 | 1675 ± 59 |
| DCU, S-D | 301 | 33498 | 2085 ± 79 | 880 | 31436 | 1690 ± 62 |
| DCU, S-H-$\in$ | 308 | 35312 | 2383 ± 71 | 909 | 32108 | 1752 ± 55 |
| DRU, H-D | 334 | 29563 | 1989 ± 63 | 845 | 30644 | 1668 ± 41 |
| DRU, S-D | 305 | 38576 | 2111 ± 90 | 905 | 31690 | 1681 ± 44 |
| DRU, S-H-$\in$ | 303 | 35544 | 2411 ± 56 | 915 | 33022 | 1779 ± 61 |

Reusing Demonstrations from Multiple Sources

This section considers the case where multiple sources of demonstrations are available in Cartpole™. Rather than combining all demonstrations together, the different sources of demonstrations are treated separately by DRoP, leveraging Equation 2. As a benchmark, Applicants train CHAT's model on the dataset formed by combining all five data sources. Results are shown in Table 4.

When low-quality demonstrations are mixed in the group, Applicants see a decreased jumpstart from both CHAT and DRoP, relative to that seen in Table 2. At the beginning, both DRoP and CHAT do have to try using the different sources for analysis and such exploration would affect the initial performance.

Over time, DRoP achieves a converged performance of 2286 steps, which is competitive to the best performance using L4 and significantly better than CHAT (via t-tests). From the reuse frequency Applicants could also tell that DRoP reused L4 the most, while CHAT treated every source equally (the reuse parameter decayed to 0.05 at the end of training). This result shows that DRoP is able to identify the quality of the prior knowledge and wisely decide what to ignore.

DRoP-In Requests for Demonstrations

Applicants have shown that DRoP is capable of analyzing the quality of demonstration. This section asks a different question—can DRoP use these confidence values to productively request additional demonstrations from a human or agent?

TABLE 2

This table shows the performance of DRoP (DRU, S-H-∈) upon 5 different levels of demonstrations in Cartpole

| Level | Demo Performance | Jumpstart | Converged Performance | Converged Reuse Frequency |
| --- | --- | --- | --- | --- |
| Q-Learning | N/A | N/A | 951 ± 136 | N/A |
| Random | 15 ± 7 | −5 | 942 ± 142 | 0.02 ± 0.01 |
| L1 | 217 ± 86 | 153 | 1453 ± 96 | 0.12 ± 0.03 |
| L2 | 435 ± 83 | 211 | 1765 ± 112 | 0.17 ± 0.04 |
| L3 | 613 ± 96 | 278 | 2080 ± 86 | 0.21 ± 0.02 |
| L4 | 821 ± 105 | 303 | 2411 ± 56 | 0.32 ± 0.03 |

TABLE 3

This table shows the performance of DRoP (DRU, S-H-∈) upon 5 different levels of demonstrations in Mario.

| Level | Demo Performance | Jumpstart | Converged Performance | Converged Reuse Frequency |
| --- | --- | --- | --- | --- |
| Q-Learning | N/A | N/A | 1569 ± 51 | N/A |
| Random | −245 ± 11 | −52 | 1552 ± 72 | 0.01 ± 0.01 |
| L1 | 315 ± 183 | 336 | 1582 ± 67 | 0.08 ± 0.02 |
| L2 | 761 ± 195 | 512 | 1601 ± 73 | 0.15 ± 0.05 |
| L3 | 1102 ± 225 | 784 | 1695 ± 81 | 0.19 ± 0.03 |
| L4 | 1512 ± 217 | 906 | 1779 ± 61 | 0.28 ± 0.04 |

TABLE 4

This table shows the performance of DRoP (DRU, S-H-∈) and CHAT upon multiple sources of demonstrations in Cartpole.

| Method | Jumpstart | Converged Performance | Converged Reuse Frequency |
| --- | --- | --- | --- |
| CHAT | 191 | 983 ± 151 | 0.05 ± 0.02 |
| DRoP | 253 | 2286 ± 91 | Random: 0.02 ± 0.01<br>L1: 0.05 ± 0.01<br>L2: 0.06 ± 0.02<br>L3: 0.11 ± 0.03<br>L4: 0.23 ± 0.02 |

In Mario™, Applicants first recorded 20 episodes of demonstrations from an human expert with an average score of 1735. Applicants then used DRoP to boost an RL agent's learning. After a short period of training (1000 episodes), Applicants then use the following steps to ask for additional demonstrations from the same human demonstrator over in the next 20 episodes:

(1) Determine average confidence of prior knowledge (i.e., CP(s)) at each step of the current episode:

$$AveC = \frac{1}{steps} \times \sum_i CP(s_i)$$

(2) Use a sliding window of 10×10 to scan neighbourhood positions and calculate the average "CP(s)" within that sliding window.

(3) If the averaged CP value is smaller than AveC, request a demonstration of 20 actions, starting at the current state.

(4) Add the above recorded state-action pairs into the request demonstration dataset of DRoP.

The requested demonstration dataset is still recorded within 20 episodes, but the time spent actively demonstrating is reduced by 44%, relative to demonstrating for 20 episodes (shown in Table 5), because demonstrations are requested only when the agent's confidence of prior knowledge is low. Applicants then compare it with the originally collected demonstration from the same human.

Figure 6:
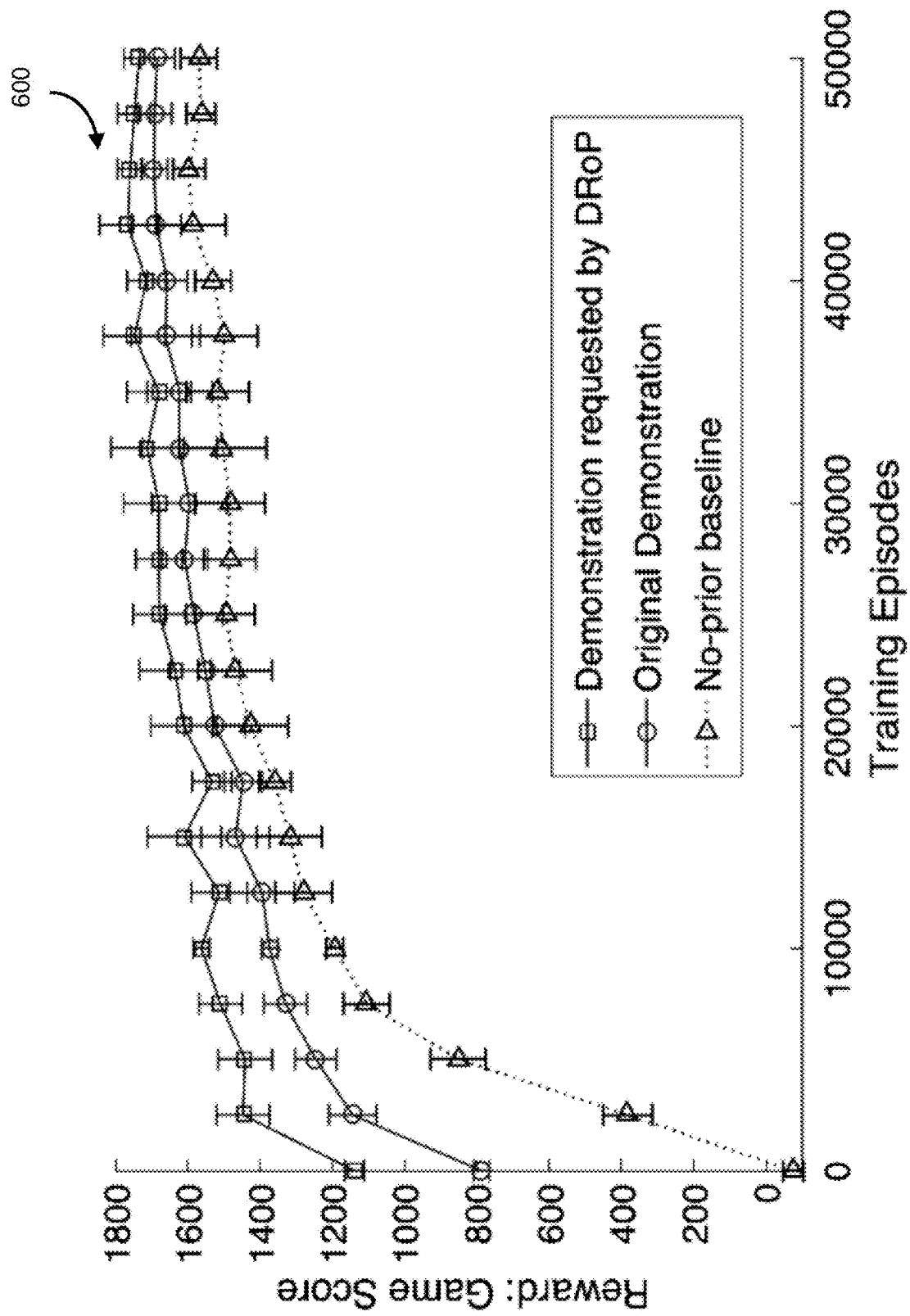
FIG. 6 is a graph illustrating learning curves using demonstration requested by DRoP and original demonstration from a human expert, according to some embodiments.

FIG. 6 is a graph illustrating learning curves using demonstration requested by DRoP and original demonstration from a human expert, according to some embodiments. FIG. 6 shows the performance comparison between the two demonstration datasets: 20 episodes of original human demonstrations and 20 episodes requested by DRoP. Notice that even though human's demonstration performance is higher than the L4 dataset from the previous section, the actual jumpstart of the former is instead lower. This is potential evidence that a virtual agent could not "digest" the entire human demonstrator's knowledge.

In contrast, learning improvement from the extra demonstration requested by DRoP is higher. DRoP would request the demonstration from human only in states where the knowledge confidence is relatively low. Therefore, Applicants know that the target agent truly needs these requested demonstrations. DRoP improved the overall learning effectiveness by requesting fewer, but critical, demonstration data.

TABLE 5

This table compares the original human demonstration and demonstration frequested by DRoP (DRU, S-H-∈).

| Souce | Time Cost | Jumpstart | Converged Performance |
| --- | --- | --- | --- |
| Baseline | 15325 s | N/A | 951 ± 136 |
| Original | 623 s | 862 | 1684 ± 49 |
| Request | 348 s | 1214 | 1736 ± 42 |

Embodiments described herein have introduced DRoP and evaluated it in two domains. This work shows that by integrating offline confidence with online temporal difference analysis, knowledge transfer from source agents or humans can be successfully achieved. DRoP outperformed both learning without prior knowledge and a recent confidence-based method.

DRoP's confidence measurement is based on temporal difference (TD) models. Results suggest that such online confidence techniques can provide reasonable and reliable analysis of the quality of prior knowledge.

Two temporal difference methods and three action selection models are introduced in this work. It is shown that DRoP's decision mechanism can leverage multiple sources of demonstrations. In experimental domains, DRU with S-H-ε produced the best performance.

Results have shown that demonstrations requested by DRoP can significantly improve the RL agent's learning process, leading to a more efficient collaboration between two very different types of knowledge entities: humans and virtual agents.

Figure 7:
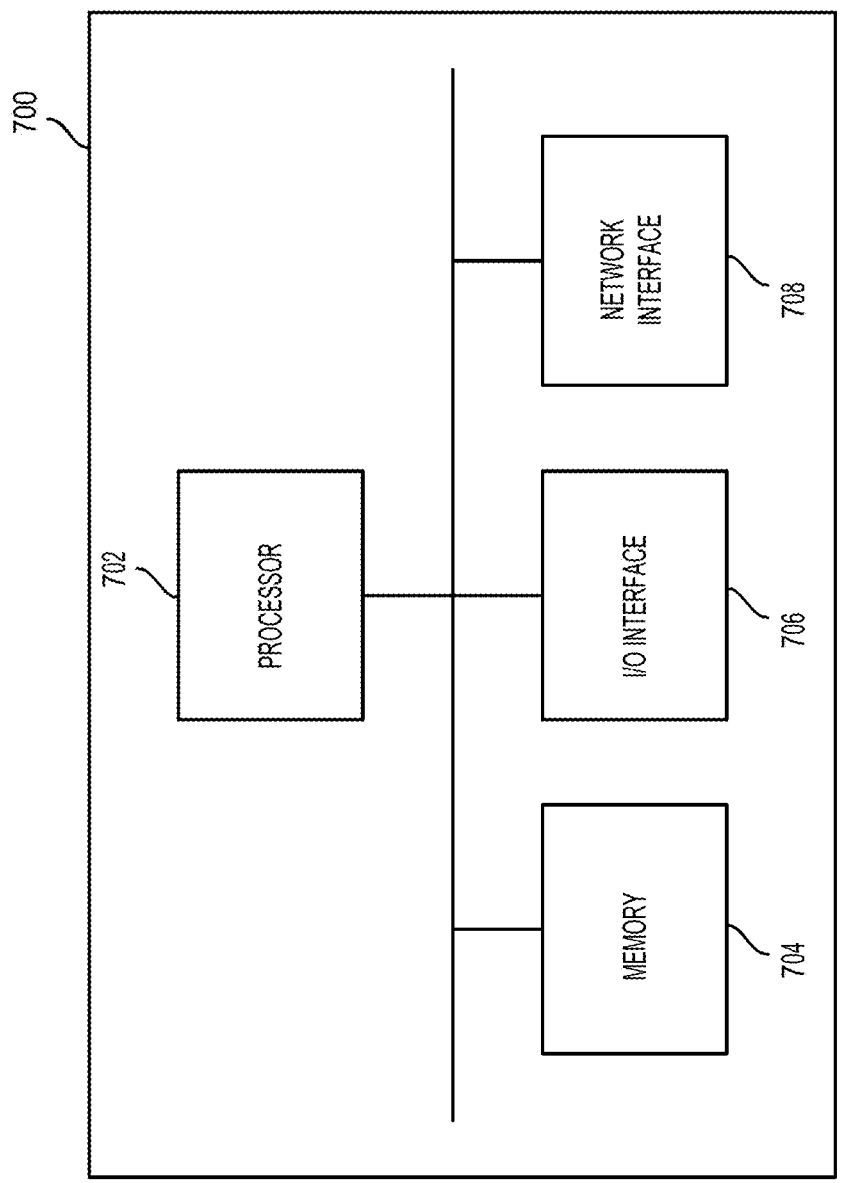
FIG. 7 is a block schematic of an example computing device, according to some embodiments.

FIG. 7 is a block schematic diagram of an example computing device, according to some embodiments. There is provided a schematic diagram of computing device 700, exemplary of an embodiment. As depicted, computing device 700 includes at least one processor 702, memory 704, at least one I/O interface 706, and at least one network interface 708. The computing device 700 is configured as a machine learning server adapted to dynamically maintain one or more neural networks.

Each processor 702 may be a microprocessor or microcontroller, a digital signal processing (DSP) processor, an integrated circuit, a field programmable gate array (FPGA), a reconfigurable processor, a programmable read-only memory (PROM), or combinations thereof.

Memory 704 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

Each I/O interface 706 enables computing device 700 to interconnect with one or more input devices, such as a keyboard, mouse, camera, touch screen and a microphone, or with one or more output devices such as a display screen and a speaker.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for biasing a machine learning architecture using one or more demonstrator data sets, the machine learning architecture for controlling one or more actions conducted by an agent in an environment which transitions between one or more states, the system comprising:
   a physical computer processor operating in conjunction with computer memory and computer storage, the processor configured to provide:
   a receiver configured to obtain one or more demonstrator data sets, each demonstrator data set including a data structure representing one or more state-action pairs observed in one or more interactions with the environment;
   a data storage configured to maintain, for each demonstrator data set or sub-portions thereof, one or more confidence data values, associated with at least one state of the one or more states;
   a supervised classifier for training using the one or more demonstrator data sets or sub-portions thereof;
   an action execution processor configured to generate control signals for executing an action associated with an action-source selected from at least one of the one or more demonstrator data sets based on the supervised classifier or an internal policy function maintained by the machine learning architecture, the selecting based at least upon the one or more confidence data values; and
   a state observer configured to monitor a new state resulting from the execution of the action and an associated reward outcome; and to update the internal policy function maintained by the machine learning architecture based at least on the observed reward outcome;
   wherein the one or more confidence data values are generated using a dynamic temporal difference confidence measurement; and wherein the dynamic temporal difference confidence measurement is based on the relation:

$$C(s) \leftarrow (1-F(\alpha))XC(s)+F(\alpha)X[F(r)+\gamma XC(s')]$$

where $\gamma$ is a discount factor, r is a reward function, and $\alpha$ is an update parameter.

2. The system of claim 1, wherein the state observer is configured to update at least one of the confidence data values of the one or more confidence data values based on the observed reward outcome.

3. The system of claim 1, wherein the temporal difference confidence measurement includes a dynamic rate update function based on the relation:

$$F(\alpha) = \alpha \times \max \left\{ \frac{1}{\Sigma_i \exp(\theta_i^T \cdot x)} \begin{bmatrix} \exp(\theta_1^T \cdot x)) \\ \exp(\theta_2^T \cdot x)) \\ \ldots \\ \exp(\theta_i^T \cdot x)) \end{bmatrix} \right\}.$$

4. The system of claim 1, wherein the temporal difference confidence measurement includes a dynamic confidence update function based on the relation:

$$F(r) = \frac{r}{r\_max} \times \max \left\{ \frac{1}{\Sigma_i \exp(\theta_i^T \cdot x)} \begin{bmatrix} \exp(\theta_1^T \cdot x)) \\ \exp(\theta_2^T \cdot x)) \\ \ldots \\ \exp(\theta_i^T \cdot x)) \end{bmatrix} \right\}$$

wherein $$\frac{r}{r\_max}$$

is a normalized reward.

5. The system of claim 1, wherein the selecting of the action-source is based upon an action selection mechanism including a hard decision architecture adapted for maximizing a current confidence expectation.

6. The system of claim 1, wherein the selecting of the action-source is based upon an action selection mechanism including a soft decision architecture adapted for maximizing a current confidence expectation, the soft decision architecture normalizing a confidence in prior knowledge score (CP(s)) and a confidence in machine learning architecture policy function (CQ(s)) based on the relation:

$$\tanh(rCQ) = \frac{e^{rCQ} - e^{-rCQ}}{e^{rCQ} + e^{-rCQ}};$$

and the action-source is determined based the relation:

$$AS = \begin{cases} Q & P = \frac{\tanh(rCQ)+1}{\tanh(rCP)+\tanh(rCQ)+2} \\ \text{Prior} & P = \frac{\tanh(rCP)+1}{\tanh(rCP)+\tanh(rCQ)+2} \end{cases} \quad (1)$$

7. The system of claim 1, wherein the selecting of the action-source is based upon an action selection mechanism including a soft-hard-$\varepsilon$ decision architecture including an $\varepsilon$-greedy switch for greedily exploiting a determined confidence value while performing probabilistic exploration.

8. The system of claim 1, wherein the one or more demonstrator data sets are a plurality of demonstrator data sets, including at least a first demonstrator data set provided from a first demonstrator and a second demonstrator data set provided from a second demonstrator, and the selection of the action-source includes selecting at least from between the first demonstrator data set and the second demonstrator data set.

9. The system of claim 1, wherein upon the confidence data value associated with a specific demonstrator data set or a portion thereof is detected to be reduced beyond a threshold value, a notification engine is configured to generate a notification requesting improved demonstration data sets from an associated source of demonstration data sets.

10. A method of biasing a machine learning architecture using one or more demonstrator data sets, and the machine learning architecture for controlling one or more actions conducted by an agent in an environment which transitions between one or more states, the method comprising:
  receiving the one or more demonstrator data sets, each demonstrator data set including a data structure representing one or more state-action pairs observed in one or more interactions with the environment;
  for each demonstrator data set or sub-portions thereof, maintaining one or more confidence data values, associated with at least one state of the one or more states;
  training a supervised classifier using the one or more demonstrator data sets or sub-portions thereof;
  executing an action associated with an action-source selected from at least one of the one or more demonstrator data sets based on the supervised classifier or an internal policy function maintained by the machine learning architecture, the selecting based at least upon the one or more confidence data values;
  observing a new state resulting from the execution of the action and an associated reward outcome; and
  updating the internal policy function maintained by the machine learning architecture based at least on the observed reward outcome;
  wherein the one or more confidence data values are generated using a dynamic temporal difference confidence measurement and; wherein the dynamic temporal difference confidence measurement is based on the relation:

$$C(s) \leftarrow (1-F(\alpha))XC(s)+F(\alpha)X[F(r)+\gamma XC(s')]$$

where $\gamma$ is a discount factor, r is a reward function, and $\alpha$ is an update parameter.

11. The method of claim 10, comprising:
  updating at least one of the confidence data values of the one or more confidence data values based on the observed reward outcome.

12. The method of claim 10, wherein the temporal difference confidence measurement includes a dynamic rate update function based on the relation:

$$F(\alpha) = \alpha \times \max \left\{ \frac{1}{\Sigma_i \exp(\theta_i^T \cdot x)} \begin{bmatrix} \exp(\theta_1^T \cdot x)) \\ \exp(\theta_2^T \cdot x)) \\ \ldots \\ \exp(\theta_i^T \cdot x)) \end{bmatrix} \right\}.$$

13. The method of claim 10, wherein the temporal difference confidence measurement includes a dynamic confidence update function based on the relation:

$$F(r) = \frac{r}{r\_max} \times \max\left\{\frac{1}{\Sigma_i \exp(\theta_i^T \cdot x)} \begin{bmatrix} \exp(\theta_1^T \cdot x)) \\ \exp(\theta_2^T \cdot x)) \\ \ldots \\ \exp(\theta_i^T \cdot x)) \end{bmatrix}\right\}$$

wherein $$\frac{r}{r\_max}$$

is a normalized reward.

14. The method of claim 10, wherein the selecting of the action-source is based upon an action selection mechanism including a hard decision architecture adapted for maximizing a current confidence expectation.

15. The method of claim 10, wherein the selecting of the action-source is based upon an action selection mechanism including a soft decision architecture adapted for maximizing a current confidence expectation, the soft decision architecture normalizing a confidence in prior knowledge score (CP(s)) and a confidence in machine learning architecture policy function (CQ(s)) based on the relation:

$$\tanh(rCQ) = \frac{e^{rCQ} - e^{-rCQ}}{e^{rCQ} + e^{-rCQ}};$$

and the action-source is determined based the relation:

$$AS = \begin{cases} Q & P = \frac{\tanh(rCQ)+1}{\tanh(rCP)+\tanh(rCQ)+2} \\ \text{Prior} & P = \frac{\tanh(rCP)+1}{\tanh(rCP)+\tanh(rCQ)+2} \end{cases} \quad (1)$$

16. The method of claim 10, wherein the selecting of the action-source is based upon an action selection mechanism including a soft-hard-ε decision architecture including an ε-greedy switch for greedily exploiting a determined confidence value while performing probabilistic exploration.

17. The method of claim 10, wherein if the confidence data value associated with a specific demonstrator data set or a portion thereof is reduced beyond a threshold value, the method comprises generating a notification requesting improved demonstration data sets from an associated source of demonstration data sets.

18. A non-transitory computer readable medium storing machine interpretable instructions, which when executed, cause a processor to perform a method of biasing a machine learning architecture using one or more demonstrator data sets, and the machine learning architecture for controlling one or more actions conducted by an agent in an environment which transitions between one or more states, the method comprising:
  receiving the one or more demonstrator data sets, each demonstrator data set including a data structure representing one or more state-action pairs observed in one or more interactions with the environment;
  for each demonstrator data set or sub-portions thereof, maintaining one or more confidence data values, associated with at least one state of the one or more states;
  training a supervised classifier using the one or more demonstrator data sets or sub-portions thereof;
  executing an action associated with an action-source selected from at least one of the one or more demonstrator data sets based on the supervised classifier or an internal policy function maintained by the machine learning architecture, the selecting based at least upon the one or more confidence data values;
  observing a new state resulting from the execution of the action and an associated reward outcome; and
  updating the internal policy function maintained by the machine learning architecture based at least on the observed reward outcome;
  wherein the one or more confidence data values are generated using a dynamic temporal difference confidence measurement; and wherein the dynamic temporal difference confidence measurement is based on the relation:

$$C(s) \leftarrow (1-F(\alpha))XC(s)+F(\alpha)X[F(r)+\gamma XC(s')]$$

where γ is a discount factor, r is a reward function, and α is an update parameter.

\* \* \* \* \*